(12) United States Patent
Kawaba et al.

(10) Patent No.: US 8,341,215 B2
(45) Date of Patent: Dec. 25, 2012

(54) PROCESSING-TIME-DEFINITION CREATING PROGRAM, PROCESSING-TIME-DEFINITION CREATING METHOD, AND INFORMATION PROCESSING APPARATUS

(75) Inventors: Motoyuki Kawaba, Kawasaki (JP); Hidekazu Takahashi, Kawasaki (JP); Yuuji Hotta, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 12/633,496

(22) Filed: Dec. 8, 2009

(65) Prior Publication Data

US 2010/0198912 A1 Aug. 5, 2010

(30) Foreign Application Priority Data

Feb. 2, 2009 (JP) .................................. 2009-021270

(51) Int. Cl.
*G06F 15/173* (2006.01)
(52) U.S. Cl. ........ 709/203; 709/224; 717/763; 717/846; 717/210; 717/125
(58) Field of Classification Search .................. 709/203, 709/224; 715/763, 846, 210; 717/125
See application file for complete search history.

(56) References Cited

U.S. PATENT DOCUMENTS

| | | | | |
|---|---|---|---|---|
| 4,914,568 A | * | 4/1990 | Kodosky et al. | 715/763 |
| 5,301,336 A | * | 4/1994 | Kodosky et al. | 715/846 |
| 5,434,777 A | * | 7/1995 | Luciw | 704/9 |
| 5,608,624 A | * | 3/1997 | Luciw | 715/210 |
| 5,610,828 A | * | 3/1997 | Kodosky et al. | 716/139 |
| 5,625,814 A | * | 4/1997 | Luciw | 707/763 |
| 5,732,277 A | * | 3/1998 | Kodosky et al. | 717/125 |
| 2005/0289231 A1 | * | 12/2005 | Harada et al. | 709/224 |

FOREIGN PATENT DOCUMENTS

| | | |
|---|---|---|
| JP | 2006-011683 | 1/2006 |
| JP | 2007-060087 | 3/2007 |

* cited by examiner

*Primary Examiner* — Tammy Nguyen
(74) *Attorney, Agent, or Firm* — Staas & Halsey LLP

(57) ABSTRACT

A processing time can be defined in a system including a plurality of computers for which the processing time is calculated, by displaying candidates of paths corresponding to flow of a series of processings as to transmission and reception of each message based on transmission and reception of messages among a plurality of computers; receiving an input that selects one path among the displayed candidates; and creating a processing time in each of computers in the flow of a series of processings as to transmission and reception of messages based on the received input.

5 Claims, 17 Drawing Sheets

| NO. | SOURCE ADDRESS | DESTINATION ADDRESS | MESSAGE TYPE | TRANSMISSION TIME | RECEPTION TIME |
|---|---|---|---|---|---|
| 1 | CLIENT | SERVER A | HTTP1 | 10:00 | 10:00 |
| 2 | SERVER A | SERVER B | IIOP1 | 10:01 | 10:01 |
| 3 | SERVER A | SERVER B | IIOP2 | 10:03 | 10:04 |
| 4 | SERVER B | SERVER A | IIOP2-res | 10:10 | 10:12 |
| 5 | SERVER B | SERVER A | IIOP1-res | 10:15 | 10:15 |
| 6 | SERVER A | CLIENT | HTTP1-res | 10:17 | 10:17 |

| NO. | SOURCE ADDRESS | DESTINATION ADDRESS | MESSAGE TYPE | SendOrder | RecvOrder |
|---|---|---|---|---|---|
| 1 | CLIENT | SERVER A | HTTP1 | 0 | 0 |
| 2 | SERVER A | SERVER B | IIOP1 | 1 | 1 |
| 3 | SERVER A | SERVER B | IIOP2 | 2 | 3 |
| 4 | SERVER B | SERVER A | IIOP2-res | 4 | 5 |
| 5 | SERVER B | SERVER A | IIOP1-res | 6 | 6 |
| 6 | SERVER A | CLIENT | HTTP1-res | 7 | 7 |

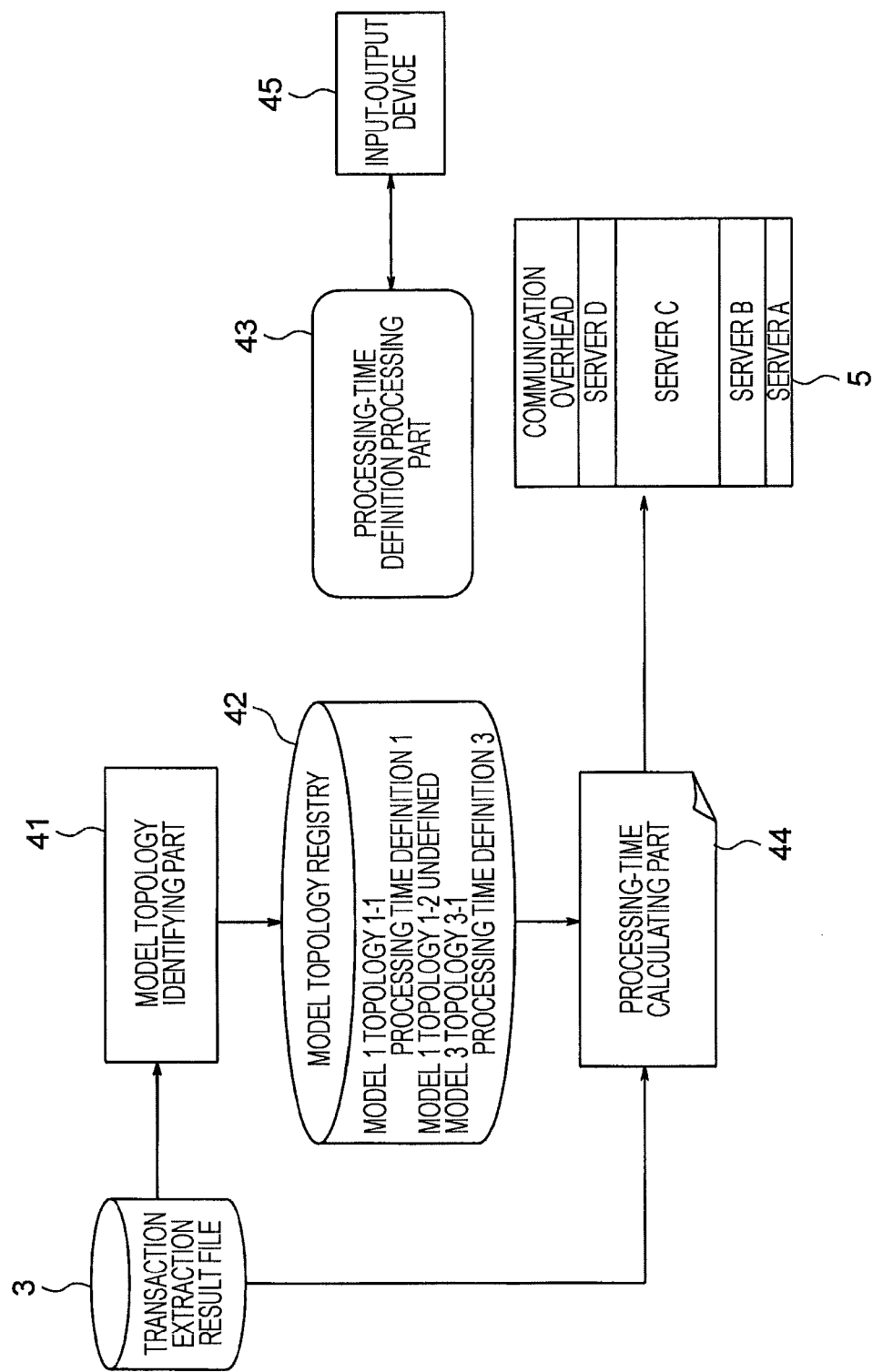

FIG. 4A

| NO. | SOURCE ADDRESS | DESTINATION ADDRESS | MESSAGE TYPE | TRANSMISSION TIME | RECEPTION TIME |
|---|---|---|---|---|---|
| 1 | CLIENT | SERVER A | HTTP1 | 10:00 | 10:00 |
| 2 | SERVER A | SERVER B | IIOP1 | 10:01 | 10:01 |
| 3 | SERVER A | SERVER B | IIOP2 | 10:03 | 10:04 |
| 4 | SERVER B | SERVER A | IIOP2-res | 10:10 | 10:12 |
| 5 | SERVER B | SERVER A | IIOP1-res | 10:15 | 10:15 |
| 6 | SERVER A | CLIENT | HTTP1-res | 10:17 | 10:17 |

FIG. 4B

| NO. | SOURCE ADDRESS | DESTINATION ADDRESS | MESSAGE TYPE | SendOrder | RecvOrder |
|---|---|---|---|---|---|
| 1 | CLIENT | SERVER A | HTTP1 | 0 | 0 |
| 2 | SERVER A | SERVER B | IIOP1 | 1 | 1 |
| 3 | SERVER A | SERVER B | IIOP2 | 2 | 3 |
| 4 | SERVER B | SERVER A | IIOP2-res | 4 | 5 |
| 5 | SERVER B | SERVER A | IIOP1-res | 6 | 6 |
| 6 | SERVER A | CLIENT | HTTP1-res | 7 | 7 |

FIG. 6
10:00, 10:00, 10:01, 10:01, 10:03, 10:04, 10:10, 10:12, } #1
10:15, 10:15, 10:17, 10:17
10:00, 10:01, 10:03, 10:04, 10:10, 10:12, 10:15, 10:17 } #2
10:00→0, 10:01→1, 10:03→2, 10:04→3, 10:10→4, } #3
10:12→5, 10:15→6, 10:17→7
GENERATION
OF OUTPUT

FIG. 14

| No. | SRC→DST | MESSAGE TYPE | SendOrder | RecvOrder |
|---|---|---|---|---|
| 1 | CLIENT→SERVER A | HTTP1 | 0 | 0 |
| 2 | SERVER A→FW | IIOP1 | 1 | 1 |
| 3 | FW→SERVER B | IIOP1 | 2 | 2 |
| 4 | SERVER B→SERVER C | DB1 | 3 | 3 |
| 5 | SERVER B→FW | IIOP2 | 4 | 4 |
| 6 | FW→SERVER A | IIOP2 | 5 | 5 |
| 7 | SERVER A→CLIENT | HTTP1 | 6 | 6 |
| 8 | SERVER C→SERVER B | DB2 | 7 | 7 |
| 9 | SERVER C→SERVER B | DB3 | 8 | 8 |
| 10 | SERVER B→FW | IIOP3 | 9 | 9 |
| 11 | FW→SERVER A | IIOP3 | 10 | 10 |
| 12 | SERVER A→CLIENT | HTTP4 | 11 | 11 |

ORDER OF APPEARANCE OF Send →

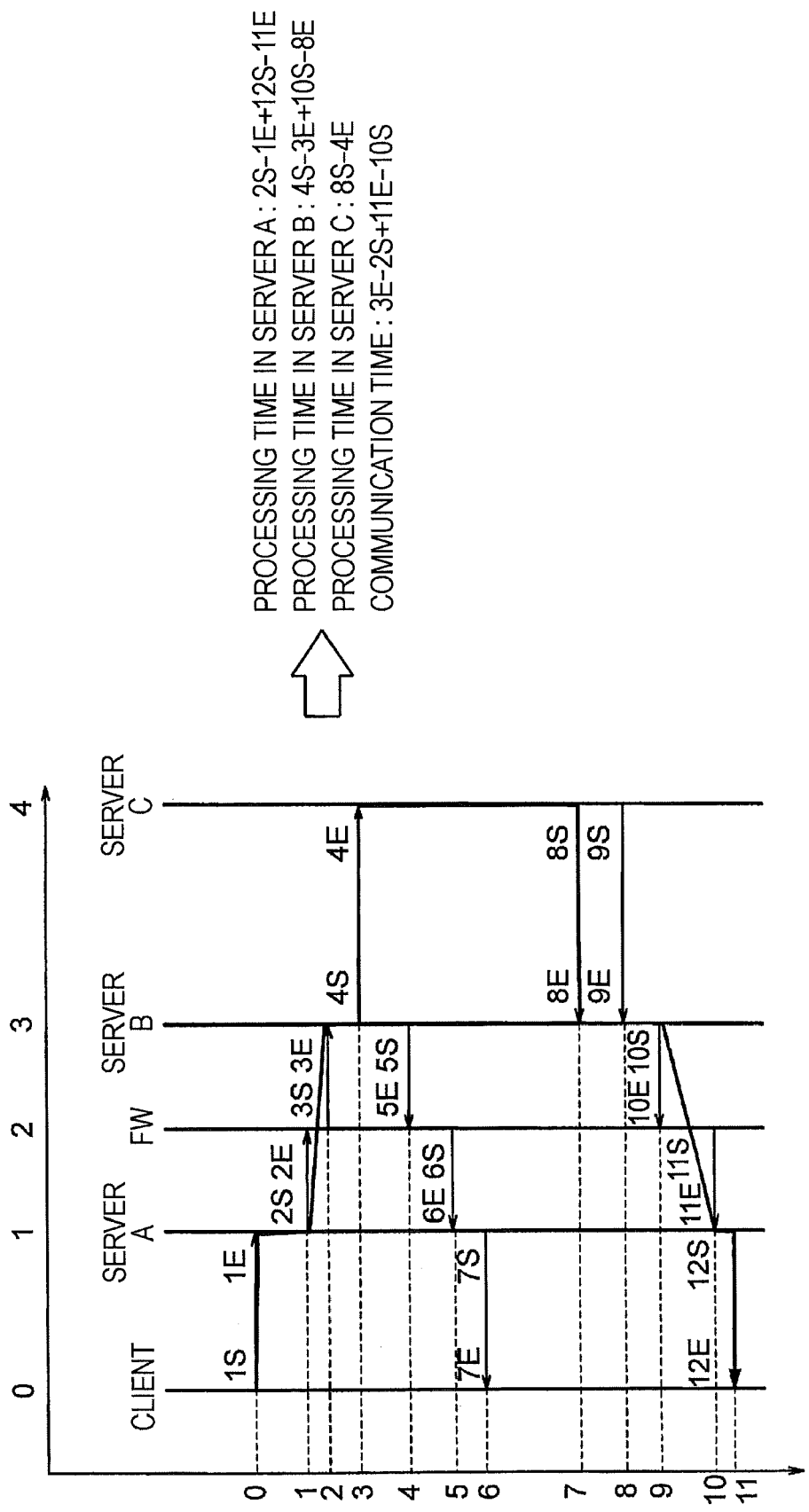

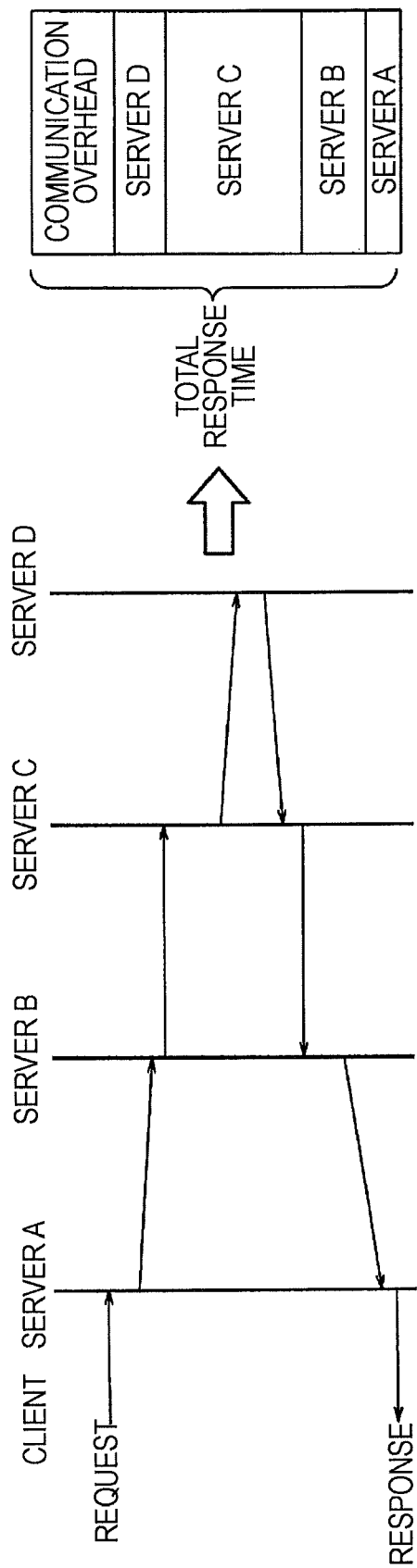

ent of the present invention;
PROCESSING-TIME-DEFINITION CREATING PROGRAM, PROCESSING-TIME-DEFINITION CREATING METHOD, AND INFORMATION PROCESSING APPARATUS

CROSS-REFERENCE TO RELATED APPLICATIONS

This application is based upon and claims the benefit of priority of the prior Japanese Patent Application No. 2009-21270, filed on Feb. 2, 2009, the entire contents of which are incorporated herein by reference.

FIELD

The present invention relates to a technology to define a processing time in a computer system.

BACKGROUND

Computer systems include systems in which multiple servers communicate with each other to process requests from clients. The systems are typified by e-commerce service systems. In such a computer system, it is required to analyze the performance of the computer system.

For example, a system analysis program is proposed, which analyzes messages collected through a network to create a transaction model and analyzes the processing state of each transaction.

Various parameters are used in order to analyze the performance of a computer system including multiple computers. The processing time in each computer can be adopted as one of such parameters. In addition, a variety of processing exists in the computer system. Accordingly, it is necessary to calculate the processing time in each computer in consideration of the processing in the computer system.

SUMMARY

According to an aspect of an embodiment, a processing time is defined in a system including a plurality of computers for which the processing time is calculated, by displaying candidates of paths corresponding to flow of a series of processings as to transmission and reception of each message based on transmission and reception of messages among a plurality of computers; receiving an input that selects one path among the displayed candidates; and creating a processing time in each of computers in the flow of a series of processings as to transmission and reception of messages based on the received input.

Additional aspects and/or advantages will be set forth in part in the description which follows and, in part, will be apparent from the description, or may be learned by practice of the various embodiments of the invention.

It is to be understood that both the foregoing general description and the following detailed description are exemplary and explanatory and are not restrictive of the invention, as claimed.

BRIEF DESCRIPTION OF THE DRAWINGS

FIG. 2 illustrates an example of the configuration of a processing-time calculating apparatus in FIG. 1;

FIG. 4A is a table illustrating an example of the transaction extraction result;

FIG. 4B is a table illustrating an example of the result of extraction of topology information;

FIG. 6 illustrates an example of how the topology information is extracted from the transaction extraction result;

FIG. 14 illustrates an example of a list of the topology information;

FIG. 15 illustrates information about the processing time of a transaction;

FIG. 16 illustrates a background;

DESCRIPTION OF EMBODIMENTS

FIG. 16 and FIGS. 17A to 17D illustrate exemplary transactions in a system in which multiple processing servers communicate with each other to process a request from a client machine.

FIG. 16 illustrates an example of a computer system in which four servers A to D communicate with each other to process a request from a client. The inventor has discussed calculation of a processing time in each of the four servers and a communication time (denoted by a communication overhead in FIG. 16) between the four servers in order to analyze the performance of the computer system in such a case.

The time from when the client transmits a processing request until when the client receives a response is hereinafter referred to as a total response time. The proportion of the processing time in each server to the total response time is hereinafter referred to as a breakdown of the processing time. The sum of the processing time in each server and the communication time is simply referred to as a processing time.

It is necessary to consider the transmission-reception mode of messages between the servers in the calculation of the processing time by the discussion by the inventor.

For example, if the transmission and reception of messages between the servers is performed in the manner illustrated in FIG. 16, it is relatively easy to define the processing time in each server. For example, the processing time in the server A is equal to the sum of the time from when the server A receives a request from the client until when the server A transmits the request to the server B and the time from when the server A receives a response from the server B until when the server A transmits the response to the client. The processing time in each of the servers B to D can be calculated in the same manner as in the server A.

However, messages are practically transmitted and received between servers in various manners, as illustrated in FIGS. 17A to 17D.

Figure 17A:
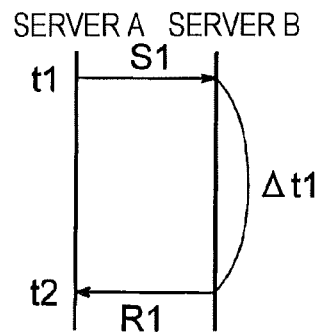
FIG. 17A illustrates an example in which transmission and reception of messages are synchronously performed.

FIG. 17A illustrates an example in which the transmission and reception of messages are synchronously performed. Referring to FIG. 17A, the server A transmits a message S1 to the server B at a time t1 and, then, the server B transmits a message R1 to the server A at a time t2. As in the example in FIG. 17A, the synchronous transmission and reception means that the number of transmitted messages coincides with the number of received messages between the two servers and that the transmission and the reception are alternately performed. In the synchronous transmission and reception, for example, a clear correspondence exists between the transmitted message S1 and the received message R1. Accordingly, a processing time Δt1 in the server B can be easily calculated by subtracting the time t1 from the time t2.

In the example in FIG. 17A, the server A may be a client (have a client role or function as a client) and the server B may be the server A (have a server role or function as a server). The same applies to FIGS. 17B to 17D.

Figure 17B:
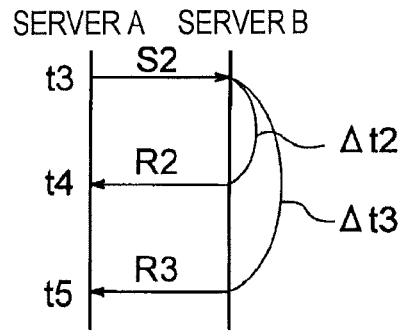
FIG. 17B illustrates an example in which transmission and reception of messages are asynchronously performed.

FIG. 17B illustrates an example in which the transmission and reception of messages are asynchronously performed. Referring to FIG. 17B, the server A transmits a message S2 to the server B at a time t3 and, then, the server B transmits a message R2 to the server A at a time t4 and transmits a message R3 to the server A at a time t5. As in the example in FIG. 17B, the asynchronous transmission and reception means that the number of transmitted messages does not coincide with the number of received messages between the two servers or that the transmission and the reception are not alternately performed although the number of transmitted messages coincides with the number of received messages between the two servers. In the asynchronous transmission and reception, for example, a clear correspondence does not exist between the transmitted message S2 and the received messages R2 and R3. Accordingly, it is necessary to define which is the processing time in the server B, a time Δt2 resulting from subtraction of the time t3 from the time t4 or a time Δt3 resulting from subtraction of the time t3 from the time t5.

Which is defined as the processing time in the server B, the time Δt2 or the time Δt3, is based on the content of the processing in the server B. The definition is established by a user who performs the analysis.

Figure 17C:
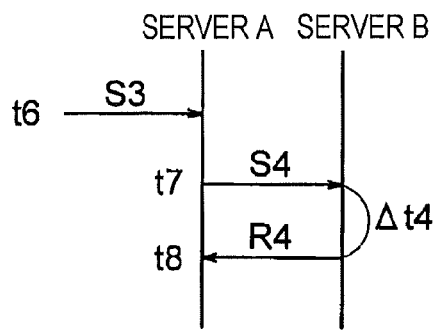
FIG. 17C illustrates an example in which transmission and reception of messages are sequentially performed.

FIG. 17C illustrates an example in which the transmission and reception of messages are sequentially performed. Referring to FIG. 17C, the server A transmits a message S4 to the server B at a time t7 in response to reception of a message S3 from another server at a time t6 and, then, the server B transmits a message R4 to the server A at a time t8. As in the example in FIG. 17C, the sequential transmission and reception means that one of the two servers transmits a first request message to the other server in response to a message that is received and receives a message from the other server before transmitting a second request message to the other server. In the sequential transmission and reception, a clear correspondence exists between the transmitted message S4 and the received message R4. Accordingly, a processing time Δt4 in the server B can be easily calculated by subtracting the time t7 from the time t8.

Figure 17D:
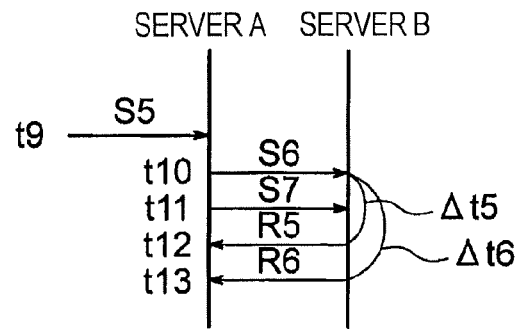
FIG. 17D illustrates an example in which transmission and reception of messages are performed in parallel.

FIG. 17D illustrates an example in which the transmission and reception of messages are performed in parallel. Referring to FIG. 17D, the server A transmits a message S6 to the server B at a time t10 and transmits a message S7 to the server B at a time t11 in response to reception of a message S5 from another server at a time t9 and, then, the server B transmits a message R5 to the server A at a time t12 and transmits a message R6 to the server A at a time t13. As in the example in FIG. 17D, the parallel transmission and reception means that one of the two servers transmits a first request message to the other server in response to a message that is received and transmits a second request message to the other server before receiving a message from the other server. In the parallel transmission and reception, for example, a clear correspondence does not exist between the transmitted message S6 and the received messages R5 and R6. Accordingly, it is necessary to define which is the processing time in the server B, a time Δt5 resulting from subtraction of the time t10 from the time t12 or a time Δt6 resulting from subtraction of the time t10 from the time t13.

Which is defined as the processing time in the server B, the time Δt5 or the time Δt6, is based on the content of the processing in the server B. The definition is established by the user who performs the analysis.

As described above, messages are transmitted and received between servers in various manners. In the examples in FIGS. 17B and 17D, since it is difficult to define the processing time, the processing time cannot be uniformly calculated. In addition, since the examples illustrated in FIGS. 17A to 17D are practically mixed, it is further difficult to define the processing time and the processing time cannot be uniformly calculated. Consequently, it is not possible to uniformly calculate the processing time by using, for example, a processing-time calculating program.

Furthermore, in the calculation of the processing time, as illustrated in FIG. 16, it is necessary for the sum of the times defined as the processing times in the respective servers to coincide with the total processing time (the total response time) from the viewpoint of the client. As described above, the definition of the processing time in each server is established by the user who performs the analysis. Accordingly, it is necessary to define the processing time in each server so that the processing times are not overlapped with each other. In addition, it is desirable that verification of whether the processing time in each server is correctly defined can be omitted.

Figure 1:
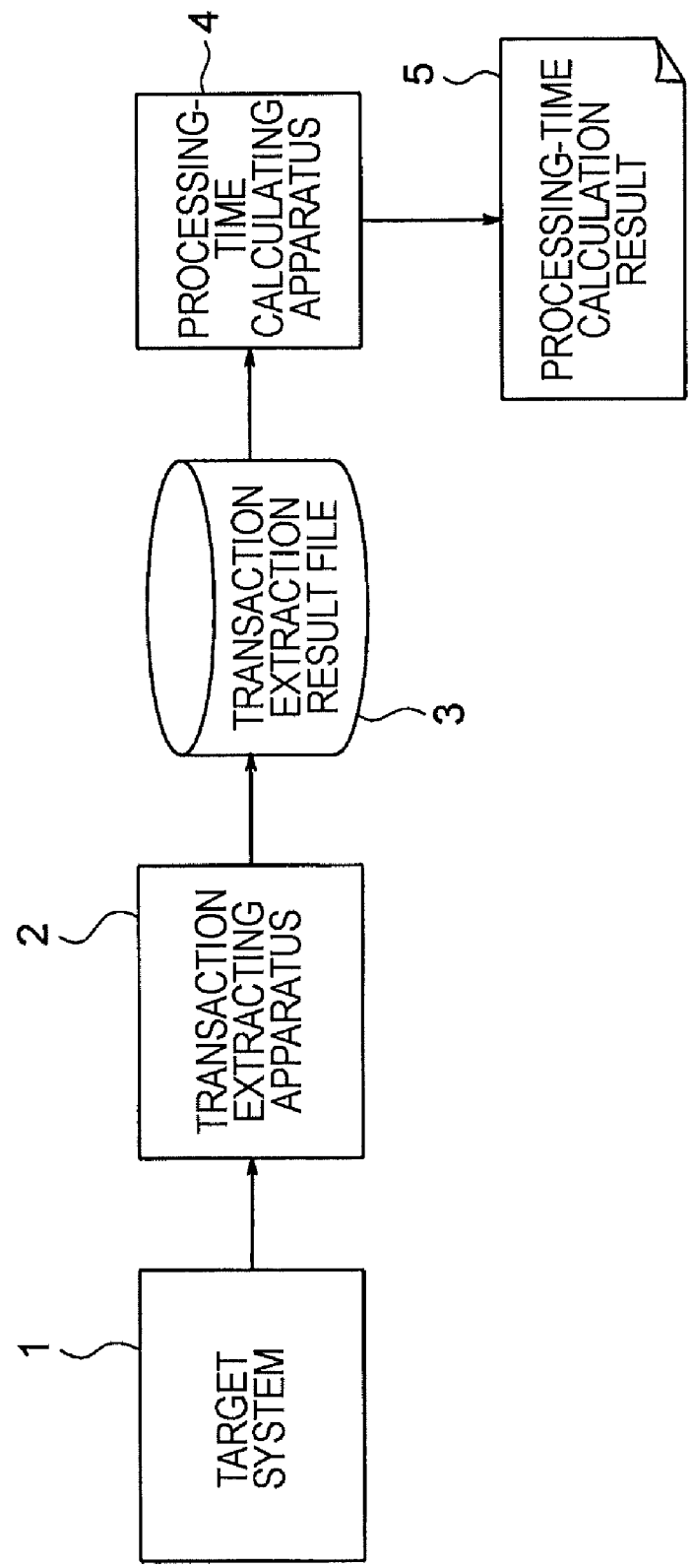
FIG. 1 illustrates an example of the configuration of a processing-time calculating system according to an embodiment of the present invention.

FIGS. 1 and 2 illustrate an example of the configuration of a processing-time calculating system according to an embodiment of the present invention.

The processing-time calculating system includes a target system 1, a transaction extracting apparatus 2, a transaction extraction result file 3, and a processing-time calculating apparatus 4.

The transaction extracting apparatus 2 extracts a transaction to be executed in the target system 1 from the target system 1 for which the processing time is calculated to obtain the transaction extraction result file 3, as illustrated in FIG. 1. The processing-time calculating apparatus 4 analyzes the transaction extraction result file 3 that is input to output a processing-time calculation result 5.

The target system 1 is a computer system including multiple computers for which the processing times are calculated. In the target system 1, a computer serving as a client machine (hereinafter simply referred to as a client) is connected to multiple computers serving as server machines (hereinafter simply referred to as servers) over a network.

In the target system 1 illustrated in FIG. 1, the multiple servers communicate with each other to process a request from the client. The network in the target system 1 is provided with, for example, a network switch connected to the network. The network switch performs mirroring (copying) of a message communicated between the client and the servers and supplies the message subjected to the mirroring to the transaction extracting apparatus 2.

The transaction extracting apparatus 2 copies the message transmitted and received in the target system 1 to extract a transaction in the target system 1 from the copied message and outputs the transaction extraction result file 3. The transaction extraction result file 3 includes one or more transaction extraction results. Each transaction extraction result includes, for example, a source address, a destination address, a message type, a transmission time, and a reception time. The transaction extraction result file 3 is stored in a storage device in the transaction extracting apparatus 2 or the processing-time calculating apparatus 4 in the example illustrated in FIG. 1.

The processing-time calculating apparatus 4 calculates a processing time in each server in the target system 1 and a communication time between the servers in the target system 1. Specifically, the processing-time calculating apparatus 4 reads out one transaction extraction result from the transaction extraction result file 3 to calculate the processing time for the readout transaction extraction result and outputs the calculated processing time as the processing-time calculation result 5.

The processing-time calculation result 5 indicates the processing time in each server, etc. in the transaction included in the transaction extraction result. For example, the processing-time calculation result 5 is output in a file, is displayed on a screen, or is printed out. The definition of the transaction extraction result will be described below with reference to FIGS. 3A and 3B. The processing time will also be described below.

FIG. 2 illustrates an example of the configuration of the processing-time calculating apparatus 4. Referring to FIG. 2, the processing-time calculating apparatus 4 includes a model topology identifying part 41, a model topology registry 42, a processing-time definition processing part 43, a processing-time calculating part 44, and an input-output device 45.

The model topology identifying part 41 extracts topology information from the transaction extraction result. The transaction extraction result is information including a source address, a destination address, a message type, a transmission time, and a reception time of each message appearing in the transaction extraction result, as described below with reference to FIG. 4A. The topology information includes a source address, a destination address, a message type, a transmission order SendOrder, and a reception order RecvOrder of each message appearing in the transaction extraction result, as described below with reference to FIG. 4B. Accordingly, the topology information is not based on the actual transmission and reception times but is based on the order of transmission and reception. The order of transmission and reception will be described below.

Specifically, the model topology identifying part 41 reads out one transaction extraction result from the transaction extraction result file 3 that is newly input into the processing-time calculating apparatus 4. The model topology identifying part 41 extracts the topology information corresponding to the readout transaction extraction result and registers the extracted topology information in the model topology registry 42. At this time, how the processing time is allocated to each server, etc. is not defined in the topology information (the processing time is not defined). Accordingly, the model topology registry 42 can possibly include the topology information for which the processing time is not defined. The topology information for which the processing time is not defined is an undefined model topology. For example, topology information "MODEL 1, TOPOLOGY 1-2, UNDEFINED" exists as the topology information for which the processing time is not defined in the example in FIG. 2.

As described below, the model topology registry 42 also includes the topology information for which the processing time is defined. The topology information for which the processing time is defined is a program for which the processing time is defined (also referred to as a processing time definition) and is a model topology including the processing time definition. For example, topology information "MODEL 1, TOPOLOGY 1-1, PROCESSING TIME DEFINITION 1" and topology information "MODEL 3, TOPOLOGY 3-1, PROCESSING TIME DEFINITION" exist as the topology information for which the processing time is defined in the example in FIG. 2.

Figure 3B:
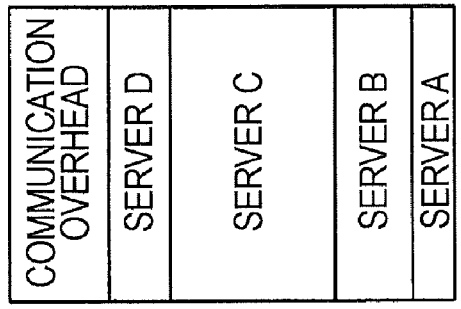
FIG. 3B illustrates an example of a processing time in the transaction extraction result.
Figure 3A:
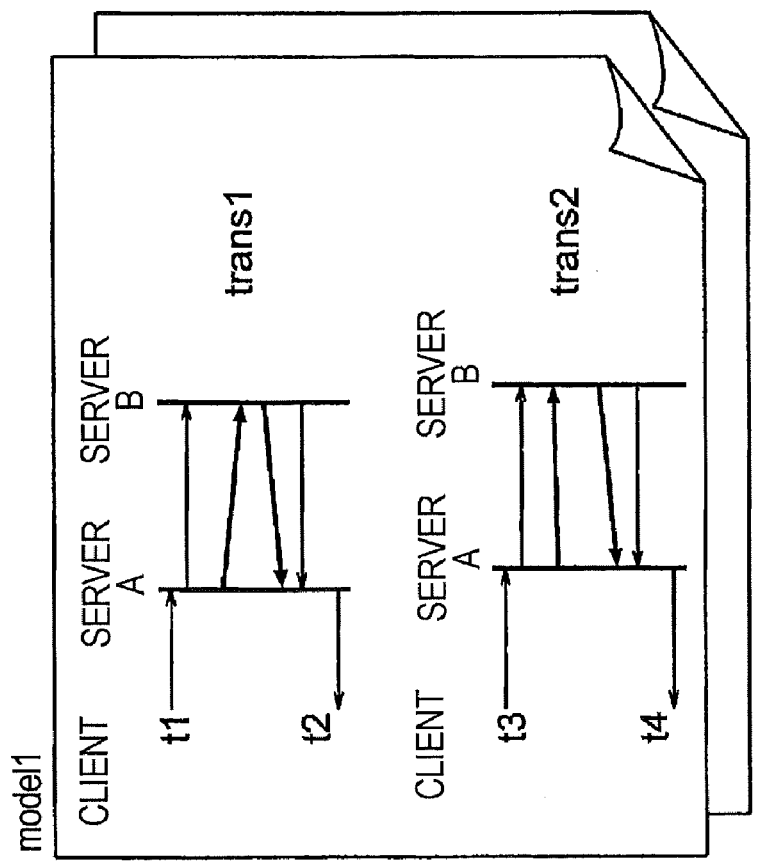
FIG. 3A illustrates an example of a transaction extraction result.

FIG. 3A illustrates an example of the transaction extraction result. The transaction extraction result represents messages communicated between the client and one server and messages communicated between the multiple servers in time series. The transaction extraction result file 3 includes at least one transaction extraction result. The transaction extraction result is created for every transaction or for every multiple transactions.

Referring to FIG. 3A, "model1" denotes one transaction extraction result stored in the transaction extraction result file 3. The transaction extraction result model1 includes two transactions: "trans1" and "trans2". In other words, the extraction results of the two transactions are reflected in the transaction extraction result model1. A client, a server A, and a server B indicated in the transaction extraction result model1 are connected to the network in the target system 1.

The transaction trans1 is one transaction extraction result. A time t1 denotes a time when a request message is transmitted from the client to the server A. A time t2 denotes a time when a response message from the server A is received by the client.

The transaction trans2 is another transaction extraction result. A time t3 denotes a time when a request message is transmitted from the client to the server A. A time t4 denotes a time when a response message from the server A is received by the client.

The model topology registry 42 registers the topology information about each transaction extraction result as the model topology. At the time of the registration, the processing time in the model topology is not defined and the model topology does not have the processing time definition. The model topology registry 42 has multiple model topologies registered therein. The model topology for which the processing time is not defined includes, for example, a model name, a topology name, and topology information. The model topology for which the processing time is defined includes, for example, a model name, a topology name, topology information, and a processing time definition. The topology information for which the processing time is not defined is a model topology for which the processing time is not defined, that is, a model topology that does not have the processing time definition.

The model name indicates the name of a model topology, such as MODEL 1, and is uniquely defined. The topology name indicates the name of topology information, such as TOPOLOGY 1-1, and is uniquely defined. The processing time definition is a program to calculate the processing time and has a name, such as PROCESSING TIME DEFINITION 1.

The processing-time definition processing part 43 defines the processing time for the topology information which is registered in the model topology registry 42 and for which the processing time is not defined on the basis of definition information input on a definition information input screen. The processing-time definition processing part 43 generates a model topology including the processing time definition and registers the generated model topology in the model topology registry 42. Practically, the processing-time definition processing part 43 adds a processing time definition that is created to the model topology for which the processing time is not defined to generate the model topology for which the processing time is defined.

The processing-time definition processing part 43 serves as a display for displaying the definition information input screen on the basis of the topology information extracted by the model topology identifying part 41. The definition information input screen is used to input the definition information defining the processing time, as described below. The definition information is processing time definition information used for defining which server or computer the processing time is allocated to and is input and defined by the user.

Specifically, the processing-time definition processing part 43 monitors the model topology registry 42 to detect topology information for which the processing time is not defined (undefined topology information) from the topology information registered in the model topology registry 42. The monitoring of the model topology registry by the processing-time definition processing part 43 is periodically performed at predetermined time intervals. If the undefined topology information exists, the user defines the processing time for the undefined topology information. The processing-time definition processing part 43 reflects the defined processing time definition in the undefined topology information. This results in definition of the processing time of the topology information, that is, generation of the model topology.

The processing-time definition processing part 43 is provided with the input-output device 45 used for displaying the definition information input screen and inputting the definition information on the definition information input screen. The input-output device 45 includes a display device provided with a display screen as an output device and includes a pointing device, such as a mouse, as an input device. The definition information input screen is displayed on the display screen of the input-output device 45. The mouse is used to point a position on the displayed definition information input screen in order to input position information.

The processing-time calculating part 44 calculates the processing time of the transaction extraction result by using the model topology which is registered in the model topology registry 42 and for which the processing time is defined. The processing time includes the processing time in each server and the communication time between the servers. Specifically, the processing-time calculating part 44 calculates the processing time including the communication time and the processing time in each server on the basis of the processing time definition. The processing-time calculating part 44 displays the result of the calculation of the processing time in the input-output device 45 or the like as the processing-time calculation result 5.

FIG. 3B illustrates an example of the processing-time calculation result 5. The processing-time calculation result 5 indicates the processing time in each of the multiple servers A to D that have executed one transaction and the communication time between the multiple servers A to D. For example, the processing-time calculation result 5 is displayed on the screen of the input-output device 45 or printed out from the input-output device 45.

As illustrated in FIG. 3B, the processing-time calculation result 5 indicates the breakdown of the processing time in the total response time indicating the time from when the client transmits a processing request until when the client receives a response in, for example, the form of a bar graph. The breakdown of the processing time represents the proportion of the processing time in each server to the total response time. The processing time includes the processing time in each server and the communication time. In other words, the processing time includes the processing time in each of the multiple servers A to D and the communication time (denoted by a communication overhead in FIG. 3B) between the multiple servers A to D. The total response time is the sum of the processing times and the communication time.

The user knows the processing time in each of the four servers and the communication time between the four servers from the processing-time calculation result 5 in order to analyze the performance of the computer system. For example, since the server C has the highest proportion of the processing time to the total response time in the example in FIG. 3B, the user can consider improvement of the processing in the server C by priority.

Extraction of topology information, performed by the model topology identifying part 41, will now be described with reference to FIG. 4A to FIG. 13.

The model topology identifying part 41 extracts output data illustrated in FIG. 4B from input data (a transaction extraction result) illustrated in FIG. 4A. The input data illustrated in FIG. 4A is an example of the transaction extraction result file 3. The output data illustrated in FIG. 4B is an example of the topology information stored in the model topology registry 42.

FIG. 4A is a table indicating data that is stored in the transaction extraction result file 3 and that represents the transaction trans1 in the transaction extraction result model1 illustrated in FIG. 3A. The data in FIG. 4A is used as the input data into the model topology identifying part 41 (hereinafter referred to as input data). The input data in the transaction extraction result file 3 is extracted for every transaction in each transaction extraction result. Each input data item stores a source address, a destination address, a message type, a transmission time, and a reception time of each message included in the transaction. The source address indicates the source of the message. The destination address indicates the destination of the message. The message type indicates the type of the transmission protocol of the message. The transmission time indicates the time when the message is transmitted. The reception time indicates the time when the message is received.

For example, a message numbered one in FIG. 4A is transmitted from the source client to the destination server A and has a message type of hypertext transfer protocol (HTTP) 1. The transmission time of the message numbered one is "10:00" and the reception time thereof is "10:00".

FIG. 4B is a table indicating data that corresponds to the transaction trans1 in the transaction extraction result model1 illustrated in FIG. 3A and that is output from the model topology identifying part 41 (hereinafter referred to as output data). The output data is the topology information stored in the model topology registry 42. Each output data item stores a source address, a destination address, a message type, a transmission order SendOrder, and a reception order RecvOrder of each message included in the topology information.

The transmission order SendOrder indicates the order in which the transmission time of the message appears in the transmission and reception of all the messages in the topology information. The reception order RecvOrder indicates the order in which the reception time of the message appears in the transmission and reception of all the messages in the topology information. In other words, the transmission order SendOrder indicates the order in which each transmission time appears and the reception order RecvOrder indicates the order in which each reception time appears, among the transmission times and the reception times, in the examples in FIGS. 4A and 4B.

Since a message numbered one is transmitted and received at the same time "10:00", which appears first, in the example in FIG. 4B, the transmission order SendOrder and the reception order RecvOrder of the message numbered one are "0". Since a message numbered three is transmitted at "10:03", which appears third, and is received at "10:04", which appears fourth, the transmission order SendOrder of the message numbered three is "2" and the reception order RecvOrder thereof is "3".

Accordingly, the output data in FIG. 4B results from sorting of the transmission times and the reception times of the messages in the input data in FIG. 4A in the order of appearance. The order of appearance of each message is not varied. In contrast, the transmission time and the reception time of each message are sorted in the order of appearance, as described below with reference to FIG. 6. Accordingly, the input data is converted into the output data, which is the topology information that does not depend on the transmission times and the reception times.

The use of the output data, that is, the topology information allows the model topology to be generated, not on the basis of the actual transmission and reception times of the messages but on the basis of the orders of transmission and reception of the messages. In other words, the messages that have the same message type and the same order of transmission and reception are processed as the same model topology even if the messages have different actual transmission and reception times, so that the number of the model topologies can be suppressed.

Figure 5:
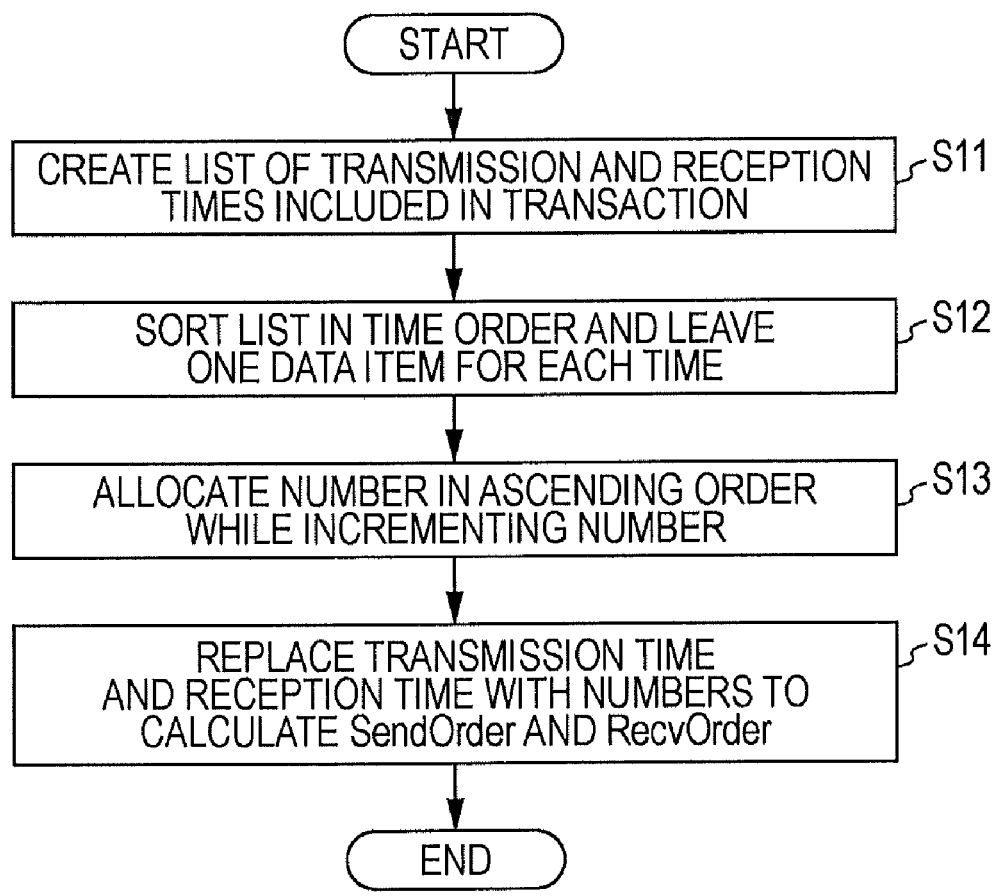
FIG. 5 is a flowchart illustrating an example of a process of extracting the topology information in the processing-time calculating apparatus.

FIG. 5 is a flowchart illustrating an example of a process of extracting the topology information, performed by the model topology identifying part 41. FIG. 6 illustrates an example of how the topology information is extracted from the transaction extraction result file 3.

Referring to FIG. 5, in S11, the model topology identifying part 41 creates a list of the transmission times and the reception times included in each transaction from the transaction extraction result file 3. For example, "10:00, 10:00, 10:01, 10:01, 10:03, 10:04, 10:10, 10:12, 10:15, 10:15, 10:17, 10:17" indicating the transmission and reception times are extracted from the input data illustrated in FIG. 4A in S11, as illustrated in #1 in FIG. 6.

In S12, the model topology identifying part 41 sorts the transmission and reception times in the created list in time order and, if multiple data items exist for one time, one data item is left and the remaining data items are removed. The extracted time data items are sorted in time order and one data item is left for one time in S12, as illustrated in #2 in FIG. 6. Specifically, the time data items "10:00, 10:01, 10:03, 10:04, 10:10, 10:12, 10:15, 10:17" are obtained.

In S13, the model topology identifying part 41 allocates the number representing the order of appearance to each time in the list created in S12 in ascending order. Numbers zero to seven are allocated to the time data items obtained in S12 in time order in S13, as illustrated in #3 in FIG. 6. For example, a number "zero" is allocated to the first time data item "10:00" ("10:00→0"). The same applies to the other time data items.

In S14, the model topology identifying part 41 replaces the transmission and reception times of each message in the transaction with the numbers allocated in 13 to calculate the transmission order SendOrder and the reception order RecvOrder. Then, the process of extracting the topology information is terminated. The transmission order SendOrder and the reception order RecvOrder of each message included in the transaction are obtained in S14. As a result, the output data illustrated in FIG. 4B is generated as the output from the model topology identifying part 41.

A process of defining the processing time, performed by the processing-time definition processing part 43, will now be described with reference to FIGS. 7 to 13.

Figure 7:
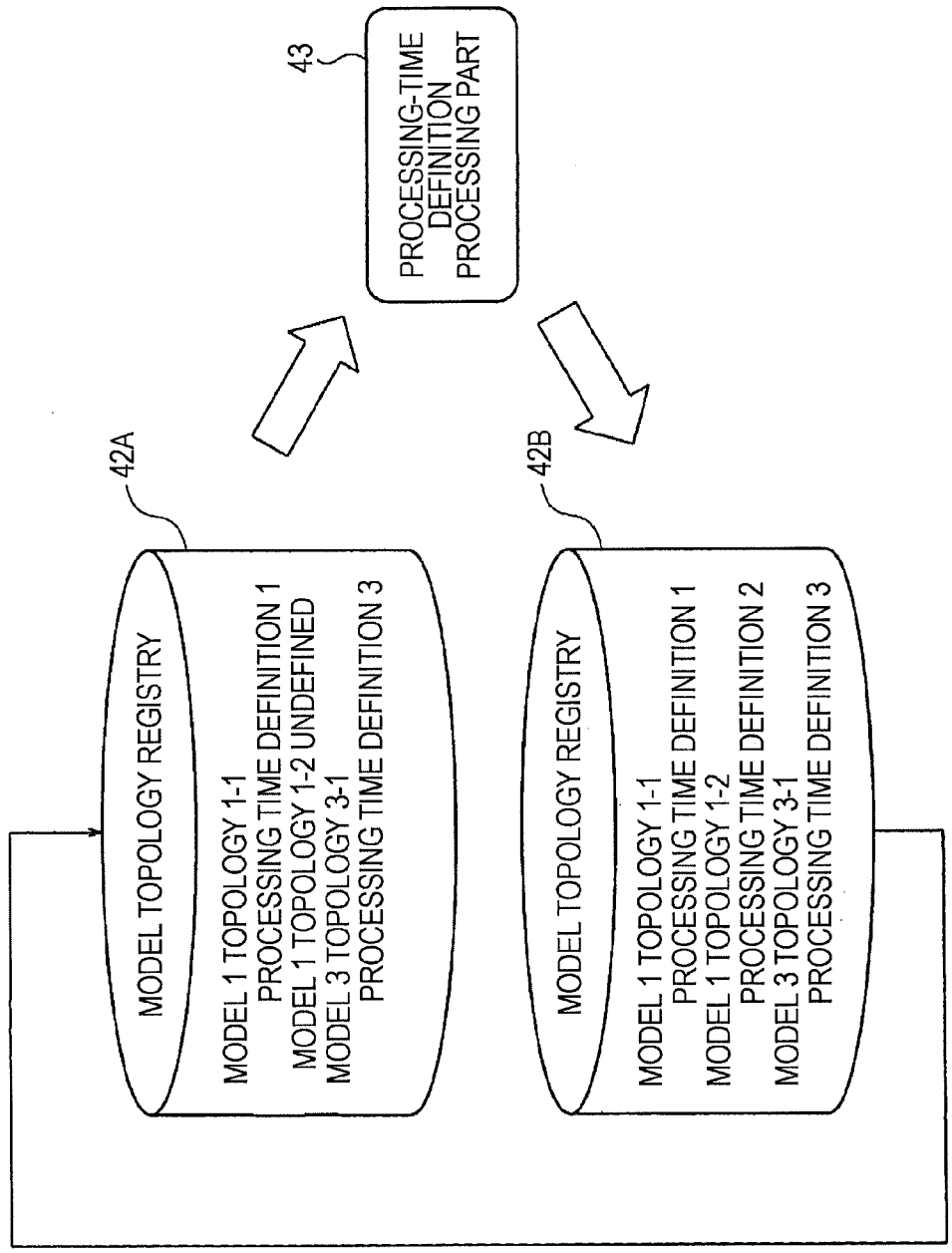
FIG. 7 illustrates an example of how a model topology is updated.

For example, it is assumed that three topology information items: "MODEL 1, TOPOLOGY 1-1, PROCESSING TIME DEFINITION 1", "MODEL 1, TOPOLOGY 1-2, UNDEFINED", and "MODEL 3, TOPOLOGY 3-1, PROCESSING TIME DEFINITION 3" are stored in a model topology registry 42A, as illustrated in FIG. 7. In other words, the topology information "MODEL 1, TOPOLOGY 1-2" for which the processing time is not defined exists in the model topology registry 42A.

The processing-time definition processing part 43 monitors the model topology registry 42 to detect the topology information "MODEL 1, TOPOLOGY 1-2" for which the processing time is not defined, as described above. The processing-time definition processing part 43 reads out the topology information "MODEL 1, TOPOLOGY 1-2" for which the processing time is not defined from the model topology registry 42A and displays the readout topology information in the input-output device 45. In response to the display of the topology information, the user inputs information necessary for defining the processing time of the displayed topology information on the display screen of the input-output device 45. The processing-time definition processing part 43 defines the processing time for the readout topology information on the basis of the input information necessary for defining the processing time. The definition of the processing time will be described below.

Then, the processing-time definition processing part 43 registers the topology information "MODEL1, TOPOLOGY 1-2" for which the processing time has been defined in a model topology registry 42B. At this time, the model name of the topology information to be registered in the model topology registry is set to "MODEL 1, TOPOLOGY 1-2, PROCESSING TIME DEFINITION 2" indicating that the processing time has been defined for the topology information.

Figure 8:
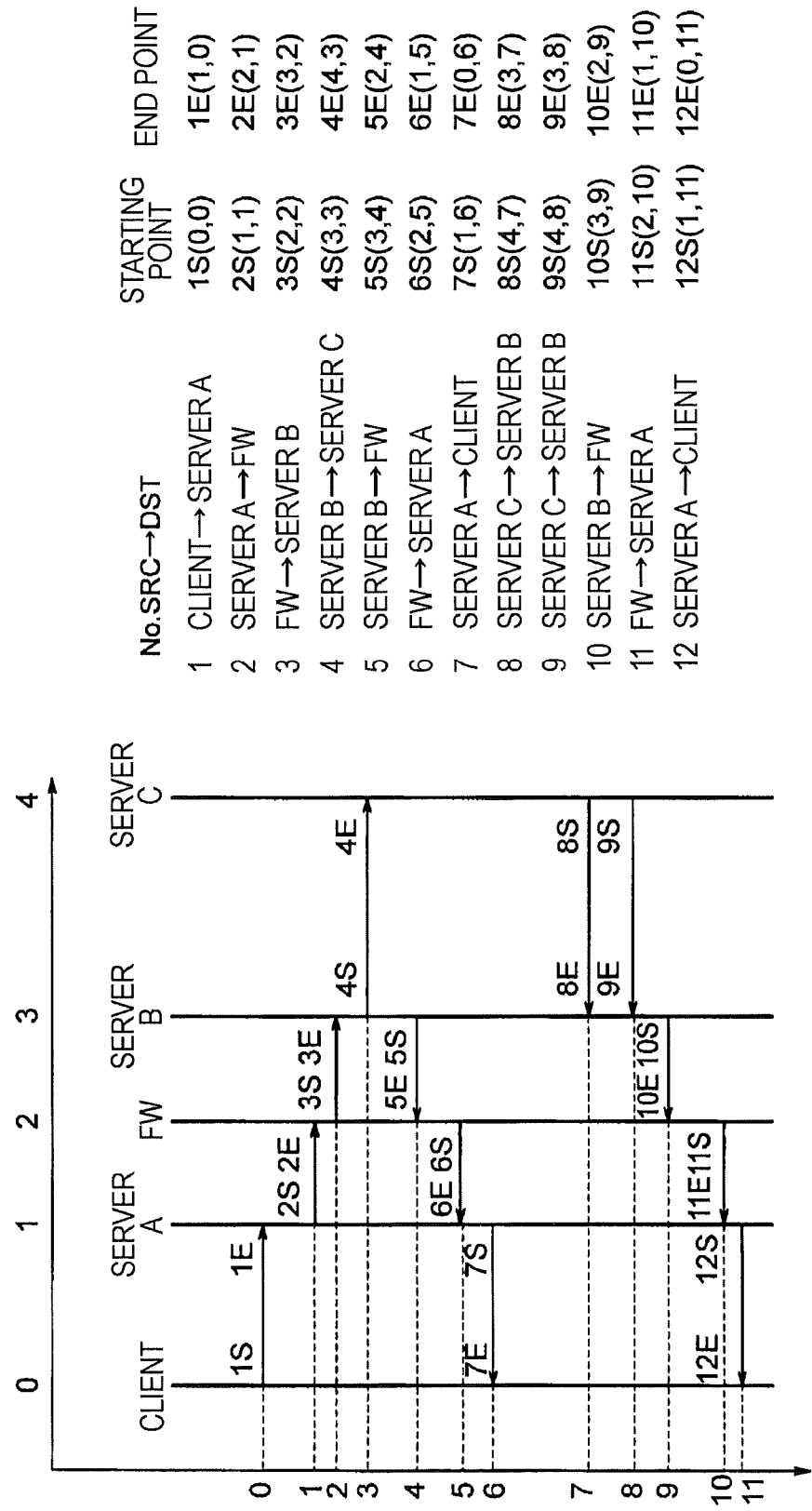
FIG. 8 illustrates an example of a definition information input screen used for inputting definition information.

FIG. 8 illustrates an example of the definition information input screen, which is displayed by the processing-time definition processing part 43 and which is used by the user for inputting the definition information.

Figure 9:
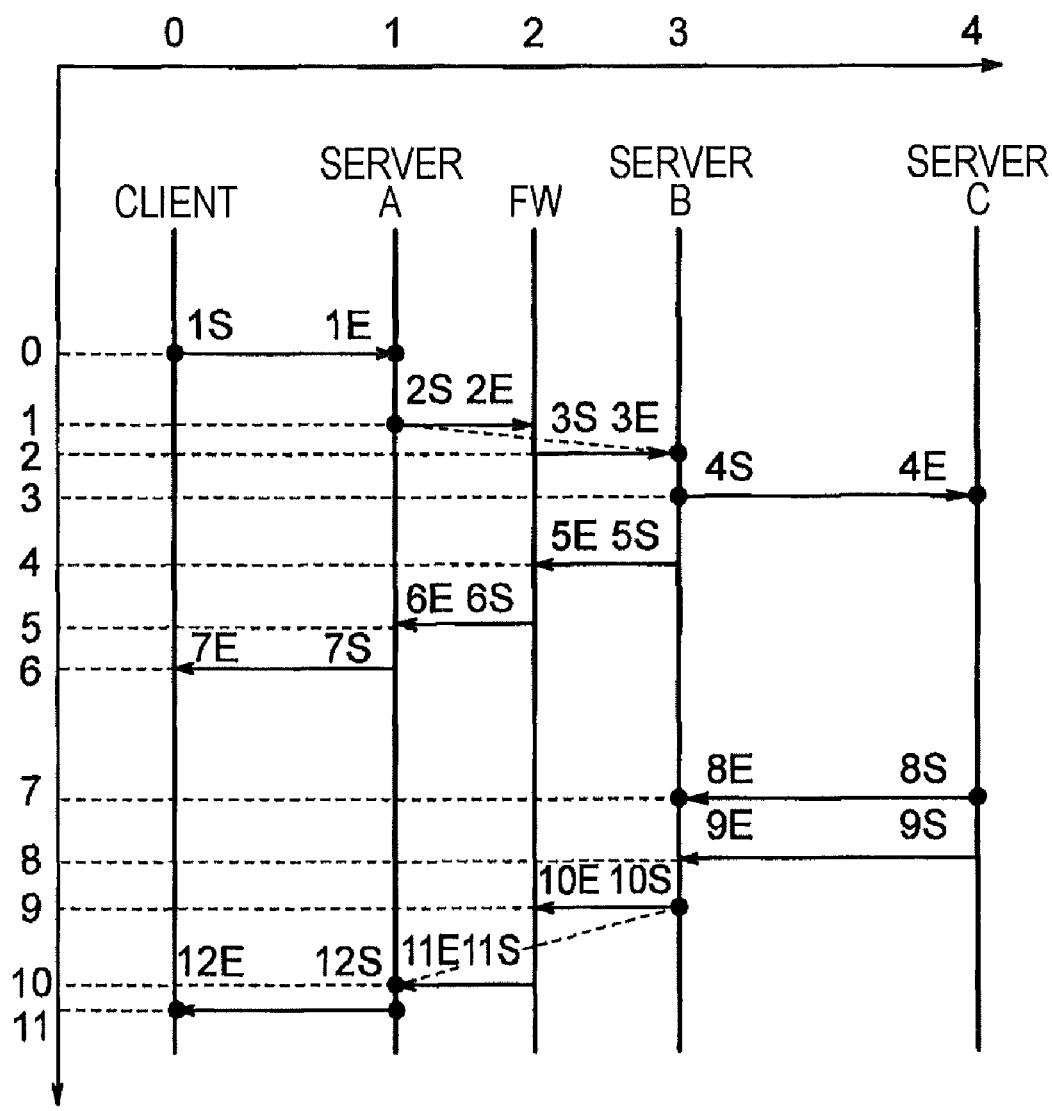
FIG. 9 illustrates an example of how to input the definition information on the definition information input screen.
Figure 10:
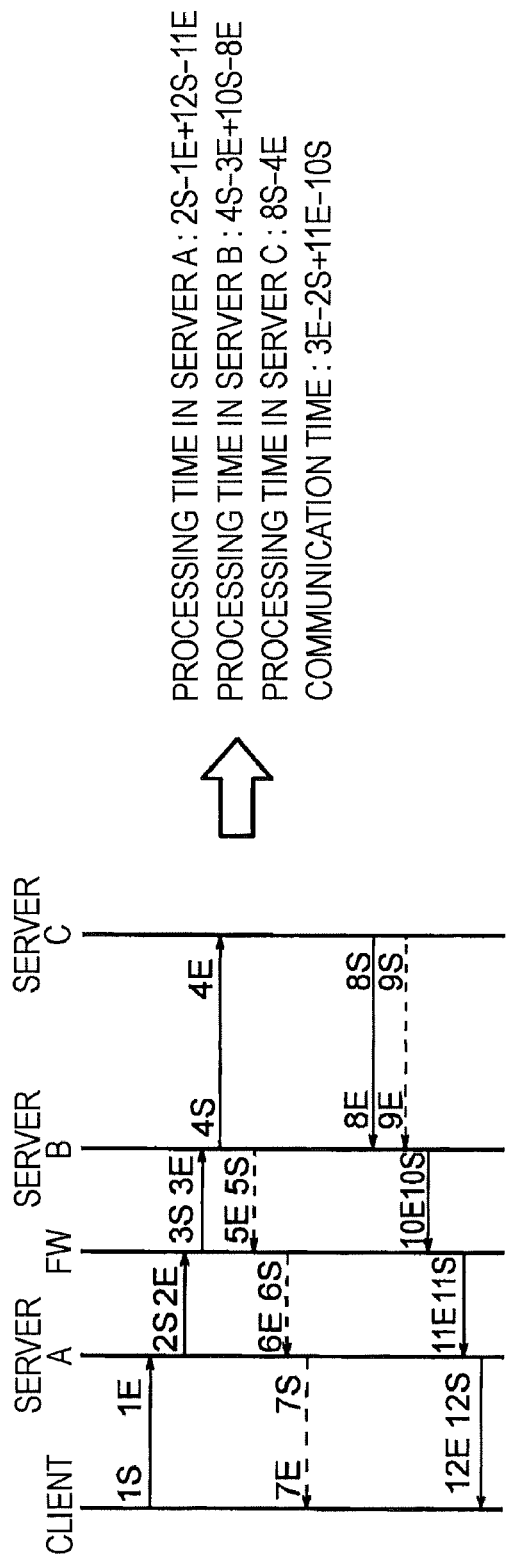
FIG. 10 illustrates an example of a model topology for which the processing time is defined.

The definition information input screen in FIG. 8 results from visualization of the topology information extracted from a transaction. The transaction illustrated in FIGS. 8 to 10 is different from the transaction illustrated in FIG. 4B.

First, the processing-time definition processing part 43 displays the definition information input screen. On the definition information input screen, the hierarchies of multiple computers among which multiple messages are transmitted and received correspond to the values of an X coordinate (first coordinate) and the orders of appearance of the multiple messages correspond to the values of a Y coordinate (second coordinate). The processing-time definition processing part 43 represents each message by using an arrow on the definition information input screen. The arrows connect the computers among which the messages are transmitted and received and each arrow has a direction corresponding to the direction of transmission or reception. In addition, the arrows exist at positions corresponding to the orders of appearance of the messages.

Specifically, the processing-time definition processing part 43 reads out the topology information "MODEL 1, TOPOLOGY 1-2" for which the processing time is not defined from the model topology registry 42A and displays the readout topology information "MODEL 1, TOPOLOGY 1-2" in the input-output device 45, as illustrated in FIG. 8. Specifically, the processing-time definition processing part 43 displays a diagram (definition information input screen) resulting from visualization of the readout topology information "MODEL 1, TOPOLOGY 1-2".

On the definition information input screen, multiple messages are displayed in order of appearance. One message is represented by one arrow. The orders of appearance of the arrows correspond to the orders of appearance of the messages. The direction of each arrow indicates the direction in which the corresponding message is transmitted.

On the definition information input screen, each number on the vertical axis or the Y axis indicates the order in which the transmission time Send or the reception time Recv of each message appears. Specifically, the numbers on the vertical axis of the definition information input screen represent the numbers indicated in the SendOrder column and the numbers indicated in the RecvOrder column in FIG. 4B. Accordingly, the numbers indicated in the SendOrder column and the numbers indicated in the RecvOrder column in FIG. 4B correspond to the Y coordinate values on the definition information input screen.

On the definition information input screen, each number on the horizontal axis or the X axis represents the number allocated to the client or each server, which is a source SRC or a destination DST of each message. Accordingly, the numbers allocated to the client and the servers correspond to the X coordinate values on the definition information input screen. The numbers on the horizontal axis are allocated to the client and the servers, each being the source SRC or the destination DST, in the order in which the client and the servers have transmitted or received messages for the first time in the topology information.

In other words, the numbers on the horizontal axis represent the hierarchies of the client and the servers, which transmit and receive the messages, in the topology information. The hierarchy is a unit of distribution of the processing time in the distribution of the processing time to the client or each server. The hierarchies may not coincide with the physical hierarchies in the computer system and may be the hierarchies in the transmission and reception of the messages. Accordingly, for example, each hierarchy may be a service layer in the computer system. Alternatively, each hierarchy may be the hierarchy of each server or computer in the computer system in which the multiple servers or computers repeat the transmission and reception of the messages to execute the processing.

A firewall FW may not be one hierarchy. In the example in FIG. 8, for example, a "hierarchy 0" may be allocated to the client or either of the servers A to B. Accordingly, if two or more hierarchies among which the messages are transmitted and received exist in the computer system, it is possible to generate the model topology. In addition, one hierarchy may include multiple computers among which the messages are transmitted and received. In this case, the multiple computers belong to the hierarchy even if the multiple computers have different Internet Protocol (IP) addresses or different server names.

On the definition information input screen in FIG. 8, the numbers on the vertical axis or the Y coordinate values start from "0". The same applies to the numbers on the horizontal axis or the X coordinate values. The Y coordinate values indicating the orders in which the transmission times or the reception times of the messages appear and the X coordinate values allocated to the sources or the destinations of the messages are allocated for every transaction extraction result by the model topology identifying part 41. The allocation is performed, for example, each time the model topology identifying part 41 reads out one transaction extraction result from the transaction extraction result file 3.

A first message is transmitted from the client, which is the source, to the server A, which is the destination. Since the transmission order SendOrder and the reception order RecvOrder are "0" if the transmission time coincides with the reception time, both of the Y coordinate values of a transmission time 1S and a reception time 1E of the first message are "0". In contrast, the X coordinate of the transmission time 1S of the first message in the client is "0" and the X coordinate of the reception time 1E of the first message in the server A is "1".

The starting point of the arrow indicating each message is represented by "S" and the end point of the arrow indicating each message is represented by "E". For example, the starting point of the arrow indicating the first message is represented by "1S" and the end point of the arrow indicating the first message is represented by "1E". In addition, for convenience, the reference numeral "1S" also represents the time when the message is transmitted and the reference numeral "1E" also represents the time when the message is received. The time represented by the reference numeral "1S" is a relative value determined by the relation with another time and does not represent a specific time. For example, the time represented by the reference numeral "1S" coincides with the other time or is a time later than the other time.

An X coordinate and a Y coordinate on the definition information input screen are given to each of the starting point and the end point of each message. As described above, the X coordinate on the definition information input screen represents the number allocated to the source or the destination of each message and the Y coordinate on the definition information input screen represents the number indicating the order in which the transmission time or the reception time of each message appears. For example, the coordinate of the starting point of the first message is represented by 1S (0,0) and the coordinate of the end point thereof is represented by 1E (1,0). The starting points and the end points of the other messages are similarly determined.

Next, the processing-time definition processing part 43 receives inputs on the definition information input screen under predetermined constraints. Examples of the constraints will be described below.

The user watches the definition information input screen in FIG. 8 to input a message processing path with the input-output device 45 in a manner illustrated in FIG. 9. How the user inputs the message processing path is based on the definition of the processing time by the user. Specifically, the user clicks the starting point or the end point of each message displayed on the definition information input screen with the mouse in the manner illustrated in FIG. 9 to define which part is allocated as the processing time in each server in the message processing path. In other words, the user selects the starting point or the end point of each message to input the definition information. How the definition information is input will be described below with reference to FIG. 9. According to an aspect of an embodiment, input of message processing path can be computer generated according to application criteria.

According to this example, processing-time definition processing part 43 permits only the following inputs from the input-output device 45. In other words, the processing-time definition processing part 43 receives the input of the definition information on the definition information input screen under the following input constraints A to D. Consequently, the processing-time definition processing part 43 does not perform the processing that defines the processing time based on an input other than the permitted inputs or ignores or discards inputs other than the permitted inputs. However, the embodiments of the invention are not limited to these constraints and/or conditions for applying constraints and any other constraints can be provided and/or any combinations of one or more of the constraints can be applied according to any condition according to application criteria.

The example constraints A to D are follows:

Constraint A: the processing-time definition processing part 43 permits only an input that specifies (clicks) the starting point and the end point of the arrow representing a message.

Constraint B: the processing-time definition processing part 43 permits only an input that specifies the hierarchy in which a message first appearing in the topology information has been transmitted as the starting point of the message processing path.

Constraint C: the processing-time definition processing part 43 permits only an input that specifies the hierarchy set as the starting point of the message processing path as the end point of the message processing path.

Constraint D: the processing-time definition processing part 43 permits only an input in which the time of the starting point or the end point that is newly specified is equal to or later than the time of the starting point or the end point that was previously specified as the message processing path.

The hierarchies here are the hierarchies of transmission and reception of the messages in the computer system and are different from the physical hierarchical structure of the computer system. In other words, the hierarchies here indicate the hierarchies of the computers, which are determined in the order of transmission and reception of the messages in the topology information to be processed, that is, for which the processing time is not defined. For example, the hierarchy of a computer that has transmitted the first message is specified as a first hierarchy. The hierarchies of the other computers are determined in the order of appearance.

In the example in FIG. 8, only an input specifying a computer that is the client that has transmitted the first message is permitted as the starting point of the message processing path, and only an input specifying the computer that is the client is permitted as the end point of the message processing path. Accordingly, the hierarchy specified under the constraints B and C is the client.

As the result of the above processing, first, the processing-time definition processing part 43 sets a continuous line segment resulting from connection of inputs or points received under the constraints A to D on the definition information input screen as the message processing path. Secondly, the processing-time definition processing part 43 sets the hierarchy or the computer set as the starting point of the message processing path as the end point of the message processing path under the constraints B and C. Thirdly, the processing-time definition processing part 43 sets the time between the Y coordinate of the specified end point and the Y coordinate of the specified starting point as the processing time in each server. Fourthly, the processing-time definition processing part 43 sets a path that connects two servers and that extends obliquely downward as the communication time between the servers.

The user can input the message processing path under the above constraints to flexibly define the processing time depending on the purpose of the analysis of the processing performance.

FIG. 9 illustrates an example of how to input the definition information on the definition information input screen.

For example, it is assumed that the topology information "MODEL 1, TOPOLOGY 1-2" for which the processing time is not defined is the transaction illustrated in FIG. 8, that is, a collection of messages. It is also assumed that the target system 1 includes a client, a server A, a firewall FW, a server B, and a server C in the example in FIG. 9 and that the messages are transmitted and received in the order illustrated in FIG. 9 in the target system 1.

In the examples in FIGS. 8 to 10, a description of the message type of each message appearing in the topology information is omitted. The message type will be described below.

Next, the processing-time definition processing part 43 defines the message processing path on the basis of the received inputs. The message processing path uniquely defines the path along which the messages are processed in the computer system. In other words, the message processing path can be drawn with one stroke on the definition information input screen. The processing-time definition processing part 43 creates the processing time definition that defines the processing time in each computer along the message processing path.

The definition information about the processing times is input in the following manner to define the processing time in the transaction illustrated in FIG. 8.

For example, the user clicks each point on the definition information input screen with the mouse, as illustrated by each black circle in FIG. 9. Specifically, the user sequentially clicks points 1S, 1E, 2S, 3E, 4S, 4E, 8S, 8E, 10S, 11E, 12S, and 12E. As a result, one path is selected. The path starts from the client, reaches the server C through the server A and the server B, and returns from the server C to the client through the server B and the server A.

For example, if the user selects the starting point 10S and the end point 11E in the example in FIG. 9, a message having a starting point 10S and an end point 10E and a message having a starting point 11S and an end point 11E are selected in the reply from the server B to the server A as part of the message defining the processing time, that is, the definition information. In other words, these messages have the meaning in terms of the definition information. Accordingly, a message having a starting point 5S and an end point 5E and a message having a starting point 6S and an end point 6E are not selected in the reply from the server B to the server A as the message defining the processing time. In other words, these messages have no meaning in terms of the definition information.

If the message having the starting point 5S and the end point 5E and the message having the starting point 6S and the end point 6E are selected in the reply from the server B to the server A as the message defining the processing time, a model topology different from the model topology based on the definition information about the processing times in FIG. 9 is generated. Accordingly, the definition information about the processing times can be varied to generate different model topologies with the same topology information.

For example, if the user selects the starting point 12S and the end point 12E in the example in FIG. 9, a message having the starting point 12S and the end point 12E is selected in the reply from the server A to the client as the message defining the processing time. Accordingly, a message having a starting point 7S and an end point 7E is not selected in the reply from the server A to the client as the message defining the processing time.

If the message having the starting point 7S and the end point 7E is selected in the reply from the server A to the client as the message defining the processing time, a model topology different from the model topology based on the definition information about the processing times in FIG. 9 is generated.

For example, if the user selects the starting point 8S and the end point 8E in the example in FIG. 9, a message having the starting point 8S and the end point 8E is selected in the reply from the server C to the server B as the message defining the processing time. Accordingly, a message having a starting point 9S and an end point 9E is not selected in the reply from the server C to the server B as the message defining the processing time.

If the message having the starting point 9S and the end point 9E is selected in the reply from the server C to the server B as the message defining the processing time, a model topology different from the model topology based on the definition information about the processing times in FIG. 9 is generated.

In contrast, if the user selects the starting point 10S and the end point 11E, as illustrated by an oblique broken line in FIG. 9, as described above, the following is defined. Specifically, between the server A and the server B, the Y coordinate of the starting point 2S is different from the Y coordinate of the end point 3E and the Y coordinate of the starting point 10S is different from the Y coordinate of the end point 11E. In other words, the transmission times of the messages are different from the reception times thereof between the server A and the server B. Accordingly, differences in the transmission times and the reception times exist between the server A and the server B, that is, the communication time in the definition of the processing time exists between the server A and the server B. In other words, the differences in the transmission times and the reception times have the meaning in terms of the definition information.

As described above with reference to FIGS. 4A and 4B, the messages have multiple message types. Accordingly, the message types are also considered when the processing time is practically defined to generate the model topology.

For example, it is assumed that the message having the starting point 2S and the end point 2E and the message having the starting point 3S and the end point 3E has a message type "IIOP1" in the topology information (first topology information) illustrated in FIGS. 8 to 10. It is also assumed that topology information (second topology information) exists, which is the same as the first topology information in FIGS. 8 to 10 except that the message having the starting point 2S and the end point 2E and the message having the starting point 3S and the end point 3E has a message type "IIOP2". In other words, the definition information input screen for the second topology information is the same as the definition information input screen for the first topology information illustrated in FIG. 8 except for the message type of the messages.

In this case, even if the same definition information as that for the first topology information is input for the second topology information, a model topology different from the model topology for the first topology information is generated. In other words, the model topology for the second topology information is different from the model topology for the first topology information based on the definition information about the processing times in FIG. 9. This is because the first topology information differs from the second topology information in the message type of the two messages although the first topology information has the same definition information as that of the second topology information.

FIG. 10 illustrates an example of the topology information for which the processing time is defined, that is, the model topology. The model topology in FIG. 10 results from input of the definition information in FIG. 9 on the definition information input screen in FIG. 8.

If the starting point 10S and the end point 11E are selected in the example in FIG. 9, the message having the starting point 10S and the end point 10E and the message having the starting point 11S and the end point 11E are selected in the reply from the server B to the server A as part of the message defining the processing time, that is, the definition information. In other words, these messages have the meaning in terms of the definition information. Accordingly, as illustrated by broken lines in FIG. 10, the message having the starting point 5S and the end point 5E and the message having the starting point 6S and the end point 6E are not selected in the reply from the server B to the server A as the message defining the processing time. In other words, these messages have no meaning in terms of the definition information.

Similarly, if the message having the starting point 12S and the end point 12E is selected in the reply from the server A to the client as the message defining the processing time, the message having the starting point 7S and the end point 7E is not selected in the reply from the server A to the client as the message defining the processing time, as illustrated by a broken line in FIG. 10.

Consequently, the processing time in the server A is defined as 2S−1E+12S−11E. Specifically, the processing time in the server A is equal to the sum of the time from the time corresponding to the coordinate 1E to the time corresponding to the coordinate 2S and the time from the time corresponding to the coordinate 11E to the time corresponding to the coordinate 12S.

Similarly, if t the message having the starting point 8S and the end point 8E is selected in the reply from the server C to the server B as the message defining the processing time, the message having the starting point 9S and the end point 9E is not selected in the reply from the server C to the server B as the message defining the processing time, as illustrated by a broken line in FIG. 10.

Consequently, in conjunction with the definition of the processing time in the reply to the server A, the processing time in the server B is defined as 4S−3E+10S−8E. The processing time in the server C is defined as 8S−4E.

Between the server A and the server B, the Y coordinate of the starting point 2S is different from the Y coordinate of the end point 3E and the Y coordinate of the starting point 10S is different from the Y coordinate of the end point 11E. In other words, the transmission times of the messages are different from the reception times thereof between the server A and the server B. Accordingly, differences in the transmission times and the reception times exist between the server A and the server B, that is, the communication time in the definition of the processing time exists between the server A and the server B. In other words, the differences in the transmission times and the reception times have the meaning in terms of the definition information.

As a result, the communication time in the computer system is defined as 3E−2S+11E−10S.

Since each point does not practically indicate a specific time but abstractly indicates the relative value of the time at each point, it is not possible to directly calculate the processing time in each server.

Figure 11:
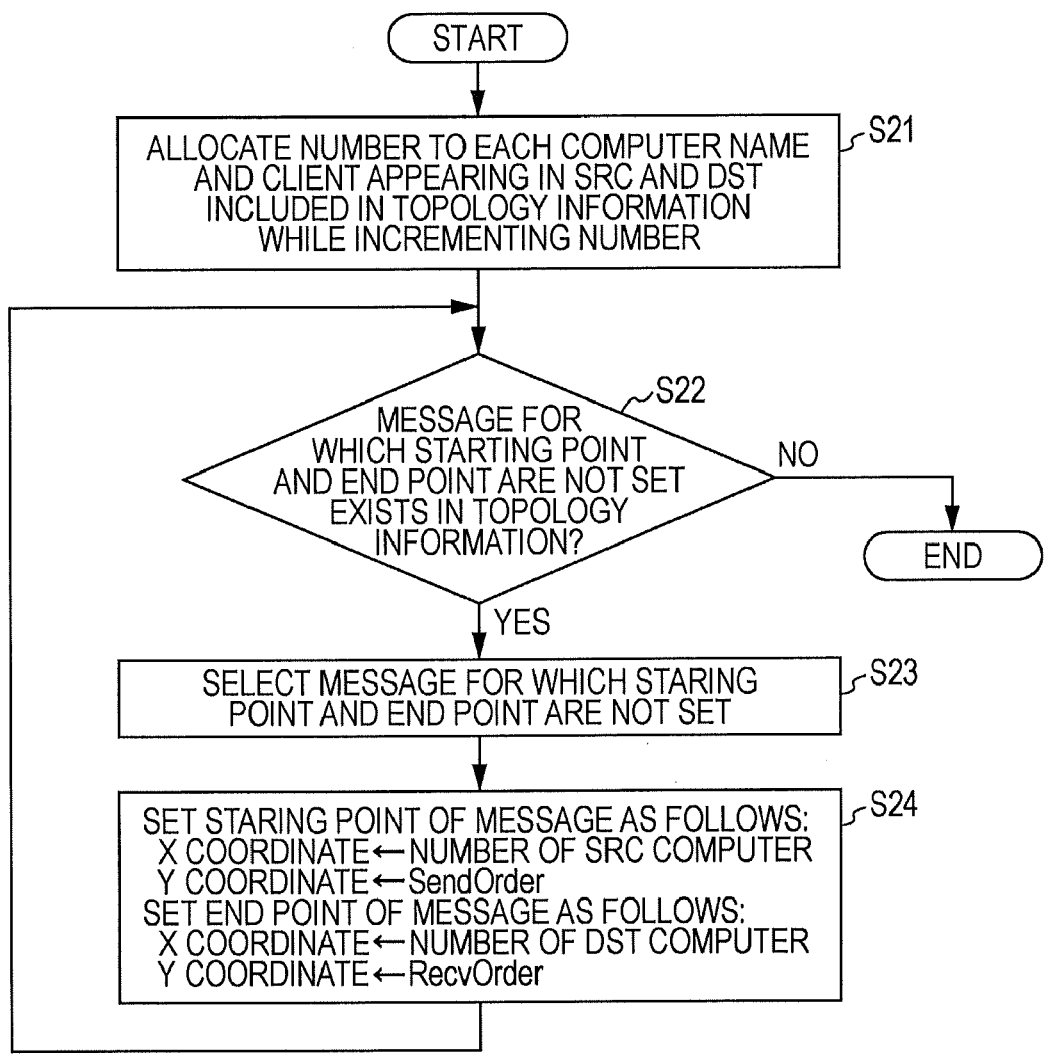
FIG. 11 is a flowchart illustrating an example of a process of inputting the definition information on the definition information input screen.

FIG. 11 is a flowchart illustrating an example of a process of inputting the definition information on the definition information input screen.

If the topology information for which the processing time is not defined exists in the model topology registry 42A, the processing-time definition processing part 43 reads out the topology information for which the processing time is not defined from the model topology registry 42A.

Then, referring to FIG. 11, in S21, the processing-time definition processing part 43 allocates a number to each of the servers (computer names) and the client appearing in the source (denoted by SRC in FIG. 11) and the destination (denoted by DST in FIG. 11) included in the readout topology information in the order of appearance while incrementing the number.

In S22, the processing-time definition processing part 43 determines whether at least one message for which the starting point and the end point are not set exists in the topology information. If the processing-time definition processing part 43 determines that no message for which the starting point and the end point are not set exists in the topology information (NO in S22), the process is terminated.

If the processing-time definition processing part 43 determines that at least one message for which the starting point and the end point are not set exists in the topology information (YES in S22), then in S23, the processing-time definition processing part 43 selects one message for which the starting point and the end point are not set.

In S24, the processing-time definition processing part 43 sets the starting point and the end point of the selected message in the following manner. As for the starting point of the message, the X coordinate on the definition information input screen is set as the number of source (SRC) server or computer and the Y coordinate on the definition information input screen is set as the transmission order SendOrder. As for the end point of the message, the X coordinate is set as the number of destination (DST) server or computer and the Y coordinate is set as the reception order RecvOrder. Then, the process goes back to S22 to repeat S22 to S24.

As the result of the process of inputting the definition information on the definition information input screen, the starting points and the end points on the definition information input screen are set for all the message included in the topology information. For example, the starting point S1 (0,0) and the end point 1E (1,0) are set for the first message, as illustrated in FIG. 8.

Figure 12:
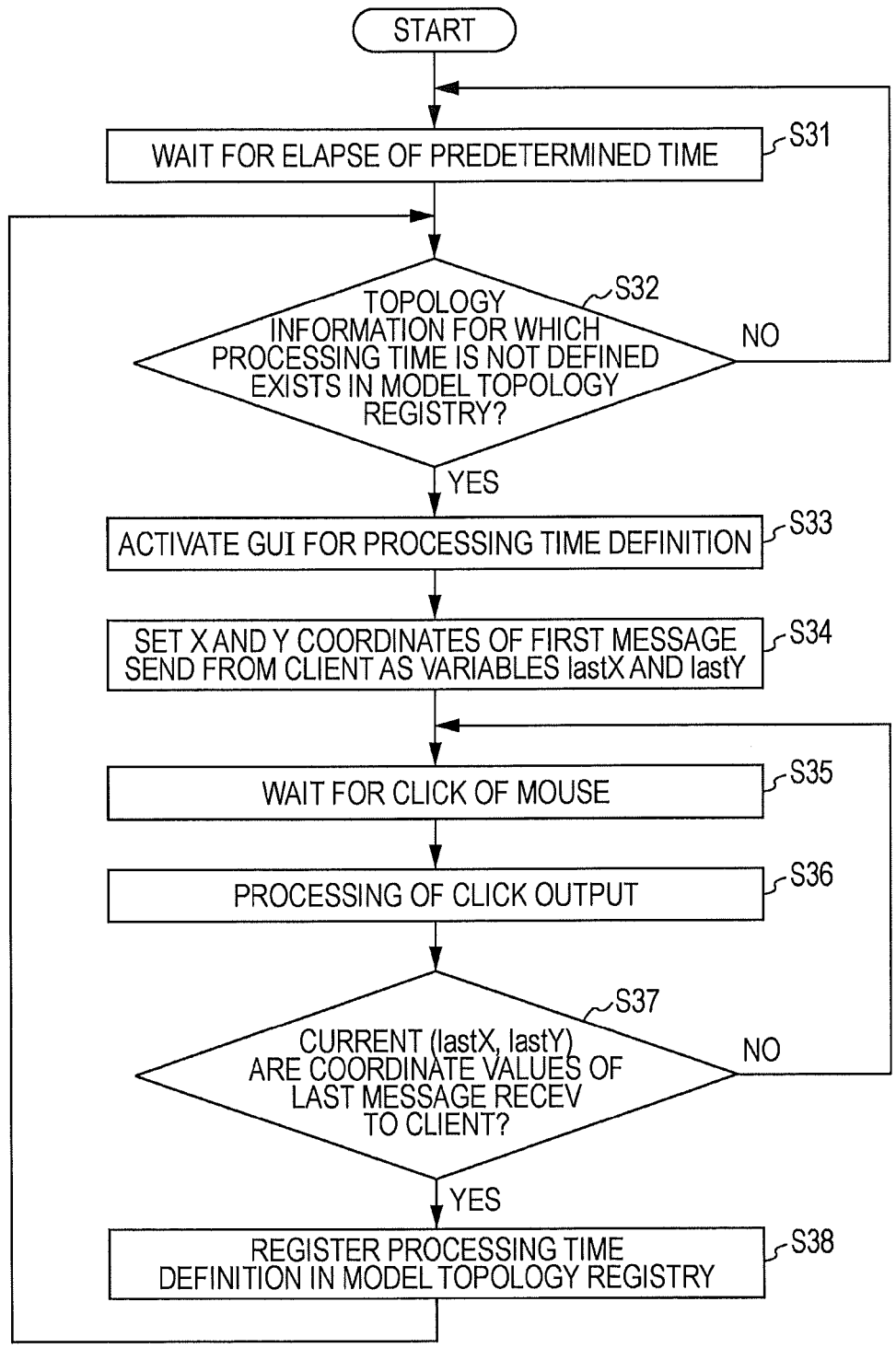
FIG. 12 is a flowchart illustrating an example of a process of defining the processing time in a model topology registry.

FIG. 12 is a flowchart illustrating an example of a process of defining the processing time in the topology information.

Referring to FIG. 12, in S31, the processing-time calculating apparatus 4 waits for elapse of a predetermined time. In S32, the processing-time calculating apparatus 4 determines whether the topology information for which the processing time is not defined, that is, the topology information that is newly added exists in the model topology registry 42. If the processing-time calculating apparatus 4 determines that the topology information for which the processing time is not defined does not exist in the model topology registry 42 (NO in S32), the process goes back to S31.

If the processing-time calculating apparatus 4 determines that the topology information for which the processing time is not defined exists in the model topology registry 42 (YES in S32), then in S33, the processing-time calculating apparatus 4 activates the processing-time definition processing part 43, which is a graphical user interface (GUI) used for defining the processing time.

In S34, the processing-time definition processing part 43 sets the X coordinate and the Y coordinate of a message SEND, which is first transmitted from the client, as a variable lastX and a variable lastY, respectively. In S35, the processing-time definition processing part 43 waits for click of the mouse. The variable lastX represents the value of the X coordinate when the mouse was previously clicked. The variable lastY represents the value of the Y coordinate when the mouse was previously clicked. The mouse has not been clicked in S34. Accordingly, the X coordinate of the first message SEND is set as the initial value of the variable lastX and the Y coordinate of the first message SEND is set as the initial value of the variable lastY. The coordinate when the mouse is clicked will be described below with reference to FIG. 13.

As described above, the starting point of the message processing path is forcedly set to the client in the example in FIG. 12. Accordingly, the input of the definition information in the topology information for which the processing time is not defined can be restricted so that the constraint B is satisfied. In other words, only the input specifying the client, which has transmitted the message first appearing in the topology information, can be permitted as the starting point of the message processing path.

If the starting point of the message processing path is set to a server, instead of the client, and the processing time is defined from the message that has been first transmitted from the server, S34 may be omitted. In this case, when the starting point of the message that has been first transmitted is input by the user who clicks the mouse in S36, the X coordinate and the Y coordinate of the starting point are set as the variable lastX and the variable lastY, respectively.

In S36, the processing-time definition processing part 43 processes the click input in response to click of the mouse by the user. It is necessary to satisfy the constraints A and D each time the click input is performed. How to process the click input will be described below with reference to FIG. 13.

In S37, the processing-time definition processing part 43 determines whether the current X and Y coordinate values (lastX, lastY) are the coordinate values of a last message RECEV to the client. In the determination in S37, for example, the processing-time definition processing part 43 compares the current X and Y coordinate values (lastX, lastY) with the coordinate values set as the variable lastX and the variable lastY in S34. The processing-time definition processing part 43 holds the coordinate values set as the variable lastX and the variable lastY in S34 until, for example, S38 is terminated in order to execute S37.

If the processing-time definition processing part 43 determines that the current X and Y coordinate values (lastX, lastY) are not the coordinate values of the last message RECEV to the client (NO in S37), the process goes back to S35 to repeat S35 to S37. Accordingly, the input of the definition information in the topology information for which the processing time is not defined can be restricted so that the constraint C is satisfied. In other words, only the input specifying the client, which is set as the starting point of the message processing path, can be permitted as the end point of the message processing path.

If the processing-time definition processing part 43 determines that the current X and Y coordinate values (lastX, lastY) are the coordinate values of the last message RECEV to the client (YES in S37), then in S38, the processing-time definition processing part 43 registers the processing time definition in the model topology registry 42. Then, the process goes back to S32 to repeat S32 to S37.

The processing-time definition processing part 43 practically defines the processing time in each of the client and the servers as, for example, 2S–1E+12S–11E to create the processing time definition in S38. Then, the processing-time definition processing part 43 adds the created processing time definition to the model topology for which the processing time is not defined, thus generating the model topology for which the processing time is defined.

The model topology for which the processing time is defined, that is, the processing time definition may be considered as a program that calculates the processing time in accordance with the processing time definition when the program is invoked from the processing-time calculating part 44 and is given the transmission and reception times of messages.

Figure 13:
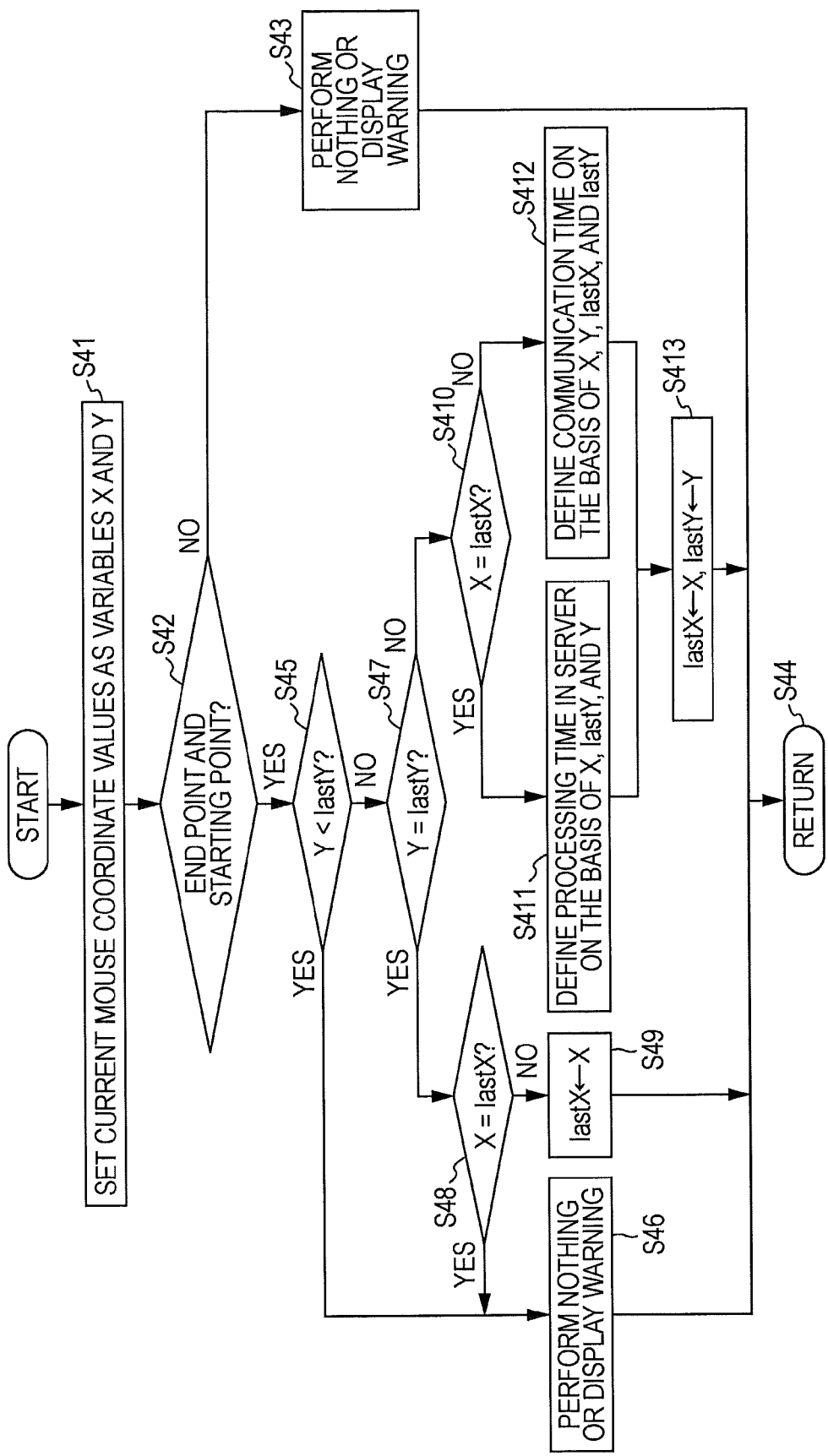
FIG. 13 is a flowchart illustrating an example of how to process a click input with a mouse.

FIG. 13 is a flowchart illustrating an example of how to process the click input with the mouse in S36.

Referring to FIG. 13, in S41, the processing-time definition processing part 43 sets the current coordinate values of the position of the mouse, that is, the coordinate values clicked with the mouse as a variable X and a variable Y. The variable X represents the X coordinate of a point clicked with the mouse on the definition information input screen, and the variable Y represents the Y coordinate of the point clicked with the mouse on the definition information input screen.

In S42, the processing-time definition processing part 43 determines whether the values of the variable X and the variable Y are the starting point and the end point of the arrow representing a message. If the processing-time definition processing part 43 determines that the values of the variable X and the variable Y are not the starting point and the end point of the arrow representing a message (NO in S42), the point or coordinate clicked with the mouse is not permitted as the input because the values of the variable X and the variable Y do not satisfy the constraint A. In other words, the input is not permitted because the point clicked with the mouse does not specify the starting point or the end point of the arrow representing a message. In this case, in S43, the processing-time definition processing part 43 performs nothing or displays a warning. In S44, the process goes back to S35 in FIG. 12. The warning in S43 indicates that, for example, the starting point or the end point that is newly specified does not specify the starting point or the end point of the arrow representing a message.

If the processing-time definition processing part 43 determines that the values of the variable X and the variable Y are the starting point and the end point of the arrow representing a message (YES in S42), in S45, the processing-time definition processing part 43 determines whether Y<lastY, that is, whether the value of the variable Y is smaller than the value of the variable lastY.

If the processing-time definition processing part 43 determines that the value of the variable Y is smaller than the value of the variable lastY (YES in S45), the point clicked with the mouse is not permitted as the input because the value of the variable Y do not satisfy the constraint D. In other words, the input is not permitted because the time of the starting point or the end point that is newly specified is not equal to or later than the time of the starting point or the end point that was previously specified. In this case, in S46, the processing-time definition processing part 43 performs nothing or displays a warning. In S44, the process goes back to S35 in FIG. 12. The warning in S46 indicates that, for example, the time of the starting point or the end point that is newly specified is earlier than the time of the starting point or the end point that was previously specified. In addition, the values of the variable lastX and the variable lastY are not updated in this case.

If the processing-time definition processing part 43 determines that the value of the variable Y is not smaller than the value of the variable lastY (NO in S45), that is, if the value of the variable Y is equal to or larger than the value of the variable lastY, the point clicked with the mouse is permitted as the input because the value of the variable Y satisfies the constraint D. In this case, in S47, the processing-time definition processing part 43 determines whether Y=lastY, that is, whether the value of the variable Y is equal to the value of the variable lastY.

If the processing-time definition processing part 43 determines that the value of the variable Y is equal to the value of the variable lastY (YES in S47), the Y coordinate value of the point clicked with the mouse is not varied. In this case, in S48, the processing-time definition processing part 43 determines whether X=lastX, that is, whether the value of the variable X is equal to the value of the variable lastX. If the processing-time definition processing part 43 determines that the value of the variable X is equal to the value of the variable lastX (YES in S48), the process goes to S46 and S44. In this case, the processing-time definition processing part 43 performs nothing because both of the X coordinate and the Y coordinate are not varied.

If the processing-time definition processing part 43 determines that the value of the variable X is not equal to the value of the variable lastX (NO in S48), then in S49, the processing-time definition processing part 43 sets lastX←X because the value of the X coordinate is varied. Specifically, the value of the variable X is set as the value of the variable lastX. Then, in S44, the process goes back to S35 in FIG. 12. In this case, the processing-time definition processing part 43 does not define the processing time in the client or the server because the Y coordinate is not varied.

If the processing-time definition processing part 43 determines that the value of the variable Y is not equal to the value of the variable lastY (NO in S47), then in S410, the processing-time definition processing part 43 determines whether X=lastX, that is, whether the value of the variable X is equal the value of the variable lastX.

If the processing-time definition processing part 43 determines that the value of the variable X is equal the value of the variable lastX (YES in S410), the value of the X coordinate is not varied but the value of the Y coordinate is varied. Accordingly, two points are specified in the same server. In this case, in S411, the processing-time definition processing part 43 defines the processing time in the server on the basis of the variable X, the variable lastY, and the variable Y. Specifically, the processing-time definition processing part 43 uses the current values of the variable X, the variable lastY, and the variable Y to determine the server to which the processing time is to be allocated. For example, the processing-time definition processing part 43 generates a pair of coordinates (X, lastY) and (X, Y) to compare the coordinates (X, lastY) and (X, Y) with the coordinates of the starting points and the end points of the messages and allocates the processing time to the server having the starting point and the end point whose coordinates coincide with the coordinates (X, lastY) and (X, Y).

In S413, the processing-time definition processing part 43 sets lastX<-X and lastY<-Y. Specifically, the value of the variable X is set as the new value of the variable lastX and the value of the variable Y is set as the new value of the variable lastY. In S44, the process goes back to S35 in FIG. 12.

If the processing-time definition processing part 43 determines that the value of the variable X is not equal the value of the variable lastX (NO in S410), the values of both of the X coordinate and the Y coordinate are varied. Accordingly, two points having different times are specified in different servers. In this case, in S412, the processing-time definition processing part 43 defines the communication time on the basis of the variable lastX, the variable X, the variable lastY, and the variable Y. Specifically, the processing-time definition processing part 43 uses the current values of the variable lastX, the variable X, the variable lastY, and the variable Y to calculate the communication time. For example, the processing-time definition processing part 43 generates a pair of coordinates (lastX, lastY) and (X, Y) to compare the coordinates (lastX, lastY) and (X, Y) with the coordinates of the starting points and the end points of the messages and sets the communication time between two servers having the starting points and the end points whose coordinates coincide with the coordinates (lastX, lastY) and (X, Y).

In S413, the processing-time definition processing part 43 sets lastX<-X and lastY<-Y. Specifically, the value of the variable X is set as the new value of the variable lastX and the value of the variable Y is set as the new value of the variable lastY. In S44, the process goes back to S35 in FIG. 12.

A process of calculating the processing time, performed by the processing-time calculating part 44, will now be described with reference to FIGS. 14 and 15.

The processing-time calculating part 44 reads out one transaction extraction result from the transaction extraction result file 3, as illustrated in FIG. 2, to compare the readout transaction extraction result with each model topology for which the processing time is defined and which is stored in the model topology registry 42.

It is assumed that the comparison shows that the readout transaction extraction result coincides with, for example, a model topology having topology information illustrated in FIG. 14. The coincidence means here that all of the message types of the messages in the readout transaction extraction result, the servers among which the messages are transmitted and received, and the order of transmission and reception coincide with the processing time definition in the model topology. In other words, when the processing time definition is created from the readout transaction extraction result, the processing time definition to be created coincides with the processing time definition in the model topology.

Referring to FIG. 14, "No." represents the number indicating the order of appearance in the topology information (the order of appearance of the transmission time Send). The smaller the number (an integer starting from one) is, the earlier the transmission time SEND appears. In "SRC→DST", SRC indicates the source of the message and DST indicates the destination of the message. "MESSAGE TYPE" indicates the message type. The transaction extraction result in FIG. 14 is a model of the transaction corresponding to FIGS. 8 to 10. Accordingly, FIG. 15 corresponds to FIG. 10.

The processing time has already been defined for the transaction extraction result illustrated in FIG. 14. Accordingly, the processing time can be calculated on the basis of the definition. Specifically, the processing times in the server A, the server B, and the server C in the target system 1 are calculated in a manner illustrated in FIG. 15.

For example, the processing-time calculating part 44 reads out the processing time definition in the model topology coinciding with the transaction extraction result from the model topology registry 42 and sets the actual transmission and reception times of the message in the readout transaction extraction result in the processing time definition to execute the processing time definition. As a result, the processing time definition outputs the processing time in each server and the communication time.

According to the embodiments described above, it is possible to easily define the processing time in each computer even if messages are transmitted and received between the servers in a computer system in various manners. In addition, it is possible to define the processing time, for example, in parallel processing so that the processing times are not overlapped with each other in the calculation of the processing time.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the target system 1, transaction extracting apparatus 2, processing time calculating apparatus, etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium encoded with a processing-time-definition creating program including instructions executable on a computer, the program defining a processing time in a computer system including a plurality of computers for which the processing time is calculated, the program causing the computer to execute: displaying a definition information input screen in which a hierarchy of transmission and reception of each message in the plurality of computers corresponds to a first coordinate value and an order of appearance of each message corresponds to a second coordinate value and in which each message is represented by an arrow that connects the computers between which the message is transmitted or received, that has a direction of transmission or reception, and that exists at a position corresponding to the order of appearance of the message; receiving an input into the definition information input screen under constraints of permitting only an input specifying a starting point and an end point of an arrow representing a message, permitting only an input specifying a hierarchy in which a first message is transmitted as a starting point of a message processing path, permitting only an input specifying the hierarchy that was set as the starting point of the message processing path as an end point of the message processing path, and permitting only an input in which a time of an starting point or an end point that is newly specified is equal to or later than a time of a starting point or an end point that was previously specified as the message processing path; and creating a processing time in each of the plurality of computers along the message processing path based on the received input.

2. The computer-readable recording medium according to claim 1, wherein only an input specifying a computer, which is a client that has transmitted a first message, is permitted as a starting point of the message processing path, and wherein only an input specifying the computer, which is the client, is permitted as an end point of the message processing path.

3. The computer-readable recording medium according to claim 1, wherein the message processing path is a displayed as a continuous line segment resulting from connection of received inputs on a definition information input screen.

4. A processing-time-definition creating method performed by a computer defining a processing time in a computer system including a plurality of computers for which the processing time is calculated, the method comprising: displaying a definition information input screen in which a hierarchy of transmission and reception of each message in the plurality of computers corresponds to a first coordinate value and an order of appearance of each message corresponds to a second coordinate value and in which each message is represented by an arrow that connects the computers between which the message is transmitted or received, that has a direction of transmission or reception, and that exists at a position corresponding to the order of appearance of the message; receiving an input into the definition information input screen under constraints of permitting only an input specifying a starting point and an end point of an arrow representing a message, permitting only an input specifying a hierarchy in which a first message is transmitted as a starting point of a message processing path, permitting only an input specifying the hierarchy that was set as the starting point of the message processing path as an end point of the message processing path, and permitting only an input in which an time of the starting point or an end point that is newly specified is equal to or later than a time of a starting point or an end point that was previously specified as the message processing path; and creating a processing time in each of the plurality of computers along the message processing path based on the received input.

5. An information processing apparatus having a processing-time-definition creating function that defines a processing time in a computer system including a plurality of computers for which the processing time is calculated, the apparatus comprising: a display processing unit configured to display a definition information input screen in which a hierarchy of transmission and reception of each message in the plurality of computers corresponds to a first coordinate value and an order of appearance of each message corresponds to a second coordinate value and in which each message is represented by an arrow that connects the computers between which the message is transmitted or received, that has a direction of transmission or reception, and that exists at a position corresponding to the order of appearance of the message; an input processing unit configured to receive an input into the definition information input screen under constraints of permitting only an input specifying a starting point and an end point of an arrow representing a message, permitting only an input specifying a hierarchy in which a first message is transmitted as a starting point of a message processing path, permitting only an input specifying the hierarchy that was set as the starting point of the message processing path as an end point of the message processing path, and permitting only an input in which a time of a starting point or an end point that is newly specified is equal to or later than a time of a starting point or an end point that was previously specified as the message processing path; and a creation processing unit configured to create a processing time in each of the plurality of computers along the message processing path based on the received input.

* * * * *

UNITED STATES PATENT AND TRADEMARK OFFICE
CERTIFICATE OF CORRECTION

PATENT NO. : 8,341,215 B2
APPLICATION NO. : 12/633496
DATED : December 25, 2012
INVENTOR(S) : Motoyuki Kawaba et al.

Page 1 of 1

It is certified that error appears in the above-identified patent and that said Letters Patent is hereby corrected as shown below:

Column 23, Line 45, In Claim 3, delete "is a" and insert -- is --, therefor.
Column 24, Line 16, In Claim 4, after "which" delete "an" and insert -- a --, therefor.

Signed and Sealed this
Twenty-sixth Day of March, 2013

Teresa Stanek Rea
*Acting Director of the United States Patent and Trademark Office*